United States Patent
Hidaka et al.

(10) Patent No.: US 9,574,917 B2
(45) Date of Patent: Feb. 21, 2017

(54) PRESSURE TYPE FLOW RATE CONTROL DEVICE

(75) Inventors: Atsushi Hidaka, Osaka (JP); Masaaki Nagase, Osaka (JP); Ryousuke Dohi, Osaka (JP); Nobukazu Ikeda, Osaka (JP); Kouji Nishino, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 1303 days.

(21) Appl. No.: 13/483,328

(22) Filed: May 30, 2012

(65) Prior Publication Data

US 2012/0298220 A1 Nov. 29, 2012

Related U.S. Application Data

(63) Continuation-in-part of application No. PCT/JP2010/004859, filed on Aug. 2, 2010.

(30) Foreign Application Priority Data

Dec. 1, 2009 (JP) .................................. 2009-273994

(51) Int. Cl.
G05D 7/06 (2006.01)
G01F 1/36 (2006.01)
G01F 15/02 (2006.01)

(52) U.S. Cl.
CPC ............. G01F 1/363 (2013.01); G01F 15/024 (2013.01); G05D 7/0635 (2013.01);
(Continued)

(58) Field of Classification Search
CPC ............. G05D 7/0635; Y10T 137/7759; Y10T 137/776; Y10T 137/7761
See application file for complete search history.

(56) References Cited

U.S. PATENT DOCUMENTS

| 5,669,408 A | 9/1997 | Nishino et al. |
| 5,868,159 A * | 2/1999 | Loan .................. G01F 1/363 137/334 |

(Continued)

FOREIGN PATENT DOCUMENTS

| JP | 3-230204 A | 10/1991 |
| JP | 8-338546 A | 12/1996 |

(Continued)

*Primary Examiner* — Jonathan Bradford
(74) *Attorney, Agent, or Firm* — Griffin and Szipl PC

(57) ABSTRACT

A pressure type flow rate control device provides flow rate control for gas at 100-500° C. with an error not more than 1.0% F.S. The pressure type flow rate control device includes a valve body with a fluid passage, a valve portion interposed in the passage, a valve drive unit driving the valve portion to open/close the passage, a restriction mechanism on the downstream side of the valve portion in the passage, a temperature detector detecting gas temperature between the valve portion and restriction mechanism, a pressure detector detecting gas pressure between the valve portion and restriction mechanism, and an arithmetic control device controlling flow rate of gas in the restriction mechanism based on values detected by the temperature detector and the pressure detector, wherein the temperature detector is inserted in an attachment hole of the valve body at a position just above an outlet side fluid passage.

14 Claims, 16 Drawing Sheets

(52) U.S. Cl.
CPC ...... *Y10T 137/776* (2015.04); *Y10T 137/7737* (2015.04); *Y10T 137/7761* (2015.04)

(56) References Cited

U.S. PATENT DOCUMENTS

| | | | | |
|---|---|---|---|---|
| 6,561,216 | B2* | 5/2003 | Kurosawa | G05D 7/0635 137/486 |
| 7,073,392 | B2* | 7/2006 | Lull | G01F 1/696 137/488 |
| 2004/0144178 | A1 | 7/2004 | Ohmi et al. | |
| 2004/0204794 | A1 | 10/2004 | Ohmi et al. | |
| 2006/0236781 | A1* | 10/2006 | Ohmi | G01F 1/42 73/861.52 |
| 2007/0151321 | A1 | 7/2007 | Ohmi et al. | |
| 2009/0171507 | A1* | 7/2009 | Ohmi | F16K 27/003 700/282 |
| 2009/0248213 | A1 | 10/2009 | Gotoh | |

FOREIGN PATENT DOCUMENTS

| | | | |
|---|---|---|---|
| JP | 9-297070 | A | 11/1997 |
| JP | 2000-259255 | A | 9/2000 |
| JP | 2003-120832 | A | 4/2003 |
| JP | 2003-195948 | A | 7/2003 |
| JP | 2005-10108 | A | 1/2005 |
| JP | 2007-57474 | A | 3/2007 |
| JP | 4082901 | B2 | 2/2008 |
| JP | 2009-176942 | A | 8/2009 |
| JP | 2009-245132 | A | 10/2009 |

\* cited by examiner

PRIOR ART

PRESSURE TYPE FLOW RATE CONTROL DEVICE

This is a Continuation-in-Part Application in the United States of International Patent Application No. PCT/JP2010/004859 filed Aug. 2, 2010, which claims priority on Japanese Patent Application No. 2009-273994, filed Dec. 1, 2009. The entire disclosures of the above patent applications are hereby incorporated by reference.

TECHNICAL FIELD OF THE INVENTION

The present invention relates to improvement of a pressure type flow rate control device to be used in a semiconductor manufacturing apparatus, etc. Specifically, the present invention relates to a pressure type flow rate control device for a high-temperature fluid that achieves high-accuracy gas flow rate control by temperature correction, using an existing temperature detector, by improving an attachment position and an attachment structure of a temperature sensor that detects a fluid temperature around a pressure detector.

BACKGROUND OF THE INVENTION

Background Art

As a device that performs flow rate control of a high-temperature fluid based on a fluid pressure and a fluid temperature, a pressure type flow rate control device using a piezoelectric element as a drive source is conventionally known. FIG. 16 shows an example thereof, and in principle, this pressure type flow rate control device is provided with a restriction mechanism S (hereinafter, referred to as orifice S) having a small hole with an appropriate opening on the downstream side of a valve portion V, and devices to detect fluid pressures $P_1$ and $P_2$ on the upstream and downstream sides of the orifice, and an apparatus to detect a fluid temperature T. The pressure type flow rate control device arithmetically operates a fluid flow rate Qc of a compressible fluid passing through the orifice S in a non-critical region in which a pressure ratio $(P_2/P_1)$ exceeds a critical pressure ratio (i.e., a subsonic region in which the flow velocity on the downstream side is lower than sonic speed) according to $Qc=KP_2^m(P_1-P_2)^n$, wherein K is a proportional constant, and m and n are constants, and arithmetically operates the fluid flow rate Qc according to $Qc=KP_1$ under critical conditions that the pressure ratio $(P_2/P_1)$ is not more than the critical pressure ratio $(r \leq r_C)$, and further applies temperature correction to the flow rate and zero-point correction to the flow rate by using the fluid temperature T. In FIG. 16, the reference symbol C denotes an arithmetic control unit, the reference symbol D denotes a valve drive unit, the reference symbol Qs denotes a set flow rate, and the reference symbol ΔQ denotes a flow rate adjustment signal.

FIG. 17 is a longitudinal sectional view showing an example of a conventional pressure type flow rate control device. In FIG. 17, the reference symbol VD denotes a valve body, the reference symbol V denotes a valve portion, the reference symbol S denotes an orifice forming a restriction mechanism, the reference symbol P denotes a pressure detector (in FIG. 17, only the pressure detector P for the pressure $P_1$ is shown, and a pressure detector for detecting the pressure $P_2$ on the downstream side of the orifice S is not illustrated), the reference symbol PE denotes a piezoelectric element, and the reference symbol K denotes a case body, and a fluid (hereinafter, may be referred to as gas) that flowed-in passes through the orifice S from the valve portion V and flows out to the downstream side as indicated by the unlabeled arrows designating direction of flow. The opening degree of the valve portion V is adjusted by the degree of expansion and contraction of the piezoelectric element PE constituting the valve drive unit. Accordingly, the pressure $P_1$ on the upstream side of the orifice S is controlled, and the flow rate of the fluid flowing through the orifice S is regulated.

The detectors for the gas pressures $P_1$ and $P_2$, the detector for the gas temperature T, and the orifice S, etc., shown in FIG. 16 are integrally installed in the valve body VD appropriately shaped as shown in FIG. 18, and the gas temperature T is detected by inserting a thermistor temperature detector TC from the side surface of the valve body VD and positioning the tip end of the detector near the fluid passage as shown in FIG. 18, and in actuality, the temperature inside the valve body VD is detected and assumed to be the gas temperature T.

PRIOR ART DOCUMENTS

Japanese Published Unexamined Patent Application No. H08-338546
Japanese Published Unexamined Patent Application No. 2003-195948
Japanese Published Unexamined Patent Application No. 2003-120832
Japanese Published Unexamined Patent Application No. 2005-10108
Japanese Patent No. 4082901

Problem to be Solved by the Invention

In the flow rate control device shown in FIG. 17, as the temperature of a gas to be measured rises, the gas volume increases. Assuming that the gas is an ideal gas, which has a specific heat ratio of 1.5 and whose temperature has adiabatically changed from 0° C. to 250° C., according to the following equation 8, the volume $V_{250}$ of the gas at 250° C. is 1.384 times the volume $V_0$ at 0° C.

$$\frac{V_{250}}{V_0} = \sqrt{\frac{273.15 + 250}{273.15}} = 1.384. \quad \text{(Equation 8)}$$

On the other hand, the inner volume of the fluid passage on the upstream side of the orifice S of the valve body VD hardly changes. Therefore, the gas density at 250° C. inside the fluid passage is 1/1.384 times the gas density at 0° C.

Therefore, for example, in the arithmetic expression of flow rate $Qc=KP_1$, to obtain a regulated gas flow rate when the gas temperature is 250° C., the control pressure $P_1$ at 250° C. must be regulated to 1.384 times the control pressure $P_1$ at 0° C., and in actuality, this pressure regulation (that is, temperature correction) is performed based on a detected temperature detected by the temperature detector TC.

However, as shown in FIG. 18, the thermistor temperature detector TC does not directly detect the gas temperature T inside the fluid passage, so that due to the temperature gradient inside the valve body VD, the actual gas temperature T and the detected temperature detected by the temperature detector TC become different from each other, and this diminishes the flow rate control accuracy. It has been proven that the temperature gradient inside the valve body VD is the cause of the deterioration of the flow rate control accuracy based on the fact that the flow rate control accuracy is significantly improved when a pressure type flow rate control device is installed inside a thermostatic chamber to eliminate the difference between the gas temperature and the temperature of the valve body VD so that the difference goes to zero.

It was found that, when a thermistor temperature detector more inexpensive than a temperature detector using a thermocouple, or a platinum resistance temperature detector, was used as the temperature detector TC, due to a temperature measurement error caused by individual variability of the thermistor temperature detector, a flow rate control error might exceed an allowable range as the gas temperature became higher.

Table 1 below shows results of measurement of the detected temperature accuracy of the thermistor temperature detector adapted for detection of so-called high temperatures (up to 250° C.). In this measurement, the experiment device shown in FIG. 19 was used, wherein the valve body VD was installed in a thermostatic chamber 31 set to 1.8 to 100° C., thermocouple temperature detectors TN and TM were installed in the thermostatic chamber 31 and the valve body VD, and the thermistor temperature detector TC was inserted in an attaching hole 14 of the valve body VD, and accordingly, the temperatures at these positions were detected. The thermocouple temperature detectors TN and TM were used for confirming that the temperature inside the thermostatic chamber was the set temperature of the thermostatic chamber 31. In Table 1, "measured value" means a detected temperature detected by the thermistor temperature detector TC, and ΔT shows a difference between a measured value and the set temperature of the thermostatic chamber 31.

Means for Solving the Problem

In the pressure type flow rate control device shown in FIG. 18, structured so that the thermistor temperature detector TC is inserted from the side surface of the valve body VD into the valve body, as shown in FIG. 1, the inventors of the present invention applied a jacket heater H as a heater for heating to the bottom surface and four side surfaces of the valve body VD and heated the valve body VD by the jacket heater H. The inventors of the present invention then measured (a) the inner surface temperatures (measuring points $M_{20}$ and $M'_{20}$) of the heater H, (b) the inner surface temperature of the attaching hole (position $M_{10}$ at a distance of approximately 10 mm from the fluid passage) for the thermistor temperature detector TC, and (c) the fluid passage temperature (measuring point $M_0$), by using a thermocouple temperature detector (not illustrated), and (d) measured the temperature distribution of the valve body VD. The valve body VD was sized with a horizontal width of 124 mm, a depth of 40 mm, and a height of 39 mm, formed from stainless steel, and a heater manufactured by SHINWA VANES was used as the jacket heater H. The jacket heater H was removably attached by a hook-and-loop fastener. In FIG. 1, the reference symbol P denotes a pressure detector.

FIG. 2 shows a relationship between the distance between the measuring point $M_{20}$, $M_{20}'$ and the fluid passage center $M_0$ and the measured temperature, and shows a temperature distribution in the depth direction (length: 40 mm) passing through the fluid passage center of the valve body VD.

As clearly seen in FIG. 2, the temperatures of the inner surfaces $M_{20}$ and $M_{20}'$ of the heater H measured with the thermocouple temperature detector were approximately 284° C., the hole bottom surface temperature of the attach-

TABLE 1

| | Set temperature (thermostatic chamber) | | | | | | | | | |
|---|---|---|---|---|---|---|---|---|---|---|
| | 1.8° C. | | 25° C. | | 50° C. | | 75° C. | | 100° C. | |
| Sample No. | Measured value | ΔT | Measured value | ΔT | Measured value | ΔT | Measured value | ΔT | Measured value | ΔT |
| 1 | 1.75 | −0.05 | 25.00 | 0.00 | 50.71 | +0.71 | 77.32 | +2.32 | 104.59 | +4.59 |
| 2 | 1.42 | −0.38 | 25.00 | 0.00 | 50.71 | +0.71 | 77.07 | +2.07 | 103.98 | +3.98 |
| 3 | 1.80 | +0.00 | 25.00 | 0.00 | 50.70 | +0.70 | 76.59 | +1.59 | 103.63 | +3.63 |
| 4 | 1.28 | −0.52 | 25.00 | 0.00 | 51.13 | +1.13 | 77.55 | +2.55 | 105.02 | +5.02 |
| 5 | 1.49 | −0.31 | 25.00 | 0.00 | 51.11 | +1.11 | 77.36 | +2.36 | 104.68 | +4.68 |
| 6 | 1.22 | −0.58 | 25.00 | 0.00 | 50.97 | +0.97 | 77.55 | +2.55 | 104.85 | +4.85 |
| 7 | 1.57 | −0.23 | 25.00 | 0.00 | 50.90 | +0.90 | 77.55 | +2.55 | 104.85 | +4.85 |
| 8 | 1.89 | +0.09 | 25.00 | 0.00 | 51.13 | +1.13 | 77.55 | +2.55 | 104.85 | +4.85 |
| 9 | 1.61 | −0.19 | 25.00 | 0.00 | 51.13 | +1.13 | 77.61 | +2.61 | 105.02 | +5.02 |
| 10 | 1.91 | +0.11 | 25.94 | +0.94 | 51.34 | +1.34 | 77.79 | +2.79 | 104.85 | +4.85 |

Referring to Table 1, it was found that as the set temperature of the thermostatic chamber became higher, the measurement error due to individual variability of the thermistor temperature detector increased, and when the set temperature of the thermostatic chamber was 100° C., the detected temperature detected by the thermistor temperature detector had an error up to +5.02° C.

A main object of the present invention is to provide a pressure type flow rate control device for high-temperature gases that minimizes deterioration of flow rate control accuracy caused by a difference between a detected temperature detected by a temperature detector and an actual gas temperature T and reduce a gas flow rate control error to ±1.0% F.S. (F.S. is an abbreviation for full scale) or less even if the gas is at 50 to 500° C.

ing hole for the thermistor temperature detector TC was 268° C., and the temperature of the fluid passage center $M_0$ was approximately 253° C., so that it was found that a temperature difference of approximately 14.1° C. occurred between the temperature of the fluid passage center $M_0$ and the detected temperature detected with the thermistor temperature detector TC.

FIG. 3 is a schematic explanatory view of a test device used for measurement of the temperature distribution and the flow rate control accuracy of the valve body VD of FIG. 2. $N_2$ gas was distributed from a $N_2$ gas source (0.6 MPa·G) to the filter F, the pressure regulator RG (for regulation to 0.2 MPa·G), the flowmeter MFC, the preheating pipe passage HT, the jacket heater H (up to 250° C.), the backup heating pipe passage HB, and the vacuum pump VP in this order, and temperatures at the respective points (for example, $M_1$ to $M_5$ shown in FIG. 9 described later) of the valve body VD of the pressure type flow rate control device FCS were measured, and various flow measurements were performed by using the temperature as a parameter for evaluating the flow rate control accuracy described later.

FIG. 4 shows flow rate control accuracy using the temperatures of the valve body VD obtained from the results of the flow measurements by the measuring device shown in FIG. 3 as parameters, and it was found that when high-temperature gas flow control was performed by using a conventional pressure type flow rate control device, deterioration of the flow rate control accuracy increased as the gas temperature measured by the thermistor temperature detector inserted into the side surface of the valve body, that is, the temperature of the valve body VD of the pressure type flow rate control device FCS became higher.

FIG. 5 shows the relationship among the gas set temperature obtained from the results of the flow measurement using the measuring device of FIG. 3, and the difference between the temperature detected by the thermistor temperature detector TC and the gas temperature (detected temperature detected by the thermocouple temperature detector at the fluid passage center $M_0$), and the flow rate error (% F.S.). FIG. 5 indicates that by reducing the difference between the gas temperature and the detected temperature of the valve body VD (detected temperature detected by the thermistor temperature detector), the flow rate control accuracy is improved.

In FIG. 4 and FIG. 5, assuming that the flow rate error of 2% F.S. during heating at 250° C. is caused only by the temperature, it becomes an issue as to what degree of a temperature difference between the detected temperature detected by the thermistor temperature detector TC and the gas temperature T the error of 2% F.S. corresponds to. On the other hand, concerning gas temperature correction, in the pressure type flow rate control device specimen FCS used in the test device in FIG. 3, it was confirmed that a flow rate error (flow rate gap) of the pressure type flow rate control device per 1 digit was 0.077% F.S./digit. Therefore, for the flow rate error of 2% F.S., a flow rate gap of approximately 26 digits (2% F.S./0.77% F.S./digit) is needed.

It was also confirmed that the temperature gap with an error according to the AD resolution in the case of a temperature monitor of the thermistor temperature detector TC was 0.61° C./digits. Therefore, the flow rate error of 2% F.S. becomes 0.61° C./digits×26 digits=15.86° C., and as a result, it was found that the flow rate error of ±1% F.S. corresponded to the difference of ±7.93° C. (15.86° C.×½) between the gas temperature and the thermistor temperature.

On the other hand, the pressure type flow rate control device for high-temperature gases, which is used for a semiconductor manufacturing apparatus, is normally used in a state in which a plurality of pressure type flow rate control devices are disposed in parallel. Therefore, the conventional structure in which the temperature detector (thermistor) is attached from the side surface of the valve body VD shown in FIG. 18 poses a problem in securing of a maintenance space for the temperature detector, and as a result, the pressure type flow rate control device is increased in size. Therefore, preferably, the temperature detector is positioned above the central axis of the fluid passage of the valve body VD and is removably attachable to the valve body from the upper side of the valve body VD. The attaching or attachment position in the axial direction is preferably between the downstream side of the valve portion (valve mechanism) V that includes a valve seat and a diaphragm valve element provided in the fluid passage of the control valve V and the orifice S.

SUMMARY OF THE INVENTION

The present invention was developed based on the results of many flow rate characteristic tests conducted for the pressure type flow rate control device by using a high-temperature fluid (high-temperature gas) as described above, and, according to a first embodiment of the present invention, a basic configuration of a pressure type flow rate control device according to the present invention includes: (a) a valve body in which a fluid passage is formed, (b) a valve portion interposed in the fluid passage, (c) a valve drive unit that opens and closes the fluid passage by driving the valve portion, (d) a restriction mechanism provided on the downstream side of the valve portion in the fluid passage, (e) a temperature detector that detects a gas temperature between the valve portion and the restriction mechanism, (f) a pressure detector that detects a gas pressure between the valve portion and the restriction mechanism, and (g) an arithmetic control device that arithmetically operates a flow rate of a gas distributed in the restriction mechanism based on detected values detected by the temperature detector and the pressure detector and controls the valve drive unit, wherein the temperature detector is inserted in an attaching hole opened inward from the upper surface side of the valve body at a position just above an outlet side fluid passage between the valve portion and the restriction mechanism.

Furthermore, in accordance with the present invention, in the case where the temperature detector is a thermistor temperature detector, the arithmetic control device includes (i) a detected value correcting element that corrects an error of a temperature detected value detected by the thermistor temperature detector, and (ii) a pressure correcting element that corrects a pressure value detected by the pressure detector based on the corrected value corrected by the detected value correcting element.

In another embodiment of the present invention, the detected value correcting element corrects an error of a gas temperature detected by the thermistor temperature detector based on temperature characteristics relating to detected temperatures detected by the thermistor temperature detector.

In another embodiment of the present invention, the temperature characteristics are related by an approximation equation obtained from two or more different temperatures.

In another embodiment of the present invention, the approximation equation is the following Equation 1:

$$Y=aX+b \quad \text{(Equation 1),}$$

(Y is a temperature corresponding to a detected temperature detected by the thermistor temperature detector, X is a temperature corresponding to a gas measured temperature measured by a thermocouple or a platinum resistance temperature detector, and a and b are constants determined for each individual thermistor temperature detector). In Equation 1, the assumption of Y=X in the range of 20 to 26° C. is preferably utilized.

Preferably, the valve body is formed of (i) a valve main body, (ii) a fluid inlet side connecting portion having a fluid inlet side joint fixed to one side surface of the valve main body, and (iii) a fluid outlet side connecting portion having a fluid outlet side joint fixed to the other side surface of the valve main body, and is configured so that a filter holding portion is provided at a position opposed to the fluid inlet side connecting portion of the valve main body, and a restriction mechanism holding portion is provided at a position opposed to the fluid outlet side connecting portion of the valve main body.

Preferably, the pressure type flow rate control device further includes: (h) a heater for heating that is provided on the outer side surface of the valve body for keeping the temperature of a gas distributed in the fluid passage at a set temperature. Furthermore, preferably, the heater for heating is a tabular heater or a jacket heater that heats the valve body to 50 to 500° C.

Preferably, the temperature detector that detects the fluid temperature is a thermistor, a platinum resistance temperature detector, or a thermocouple, etc. Preferably, the fluid temperature detector attachment hole provided just above the outlet side fluid passage has an appropriate, predetermined depth, and the distance between the bottom surface of the attachment hole and the upper wall surface of the outlet side fluid passage is 0.1 to 5.0 mm.

The flow rate control accuracy of the pressure type flow rate control device is preferably set so that the flow rate error becomes 1.0% F.S. or less in a gas temperature range of 50 to 500° C. The fluid temperature detector is preferably fixed by placing a spacer above the fluid temperature detector inserted in the attachment hole and pressing and fixing the upper surface of the spacer by a flange portion provided on the lower side of a cylinder holder that forms a control valve.

Preferably, the valve drive unit is a multilayer piezoelectric element, a cylinder holder that holds the valve drive unit is attached to the valve body, and the temperature detector is fixed to the valve body by placing a spacer above the temperature detector inserted in the attachment hole and pressing and fixing the upper surface of the spacer by a flange portion provided on the cylinder holder. Preferably, the pressure detector and the temperature detector are configured separately from the valve body, and are combined with the valve body.

Thus, the present invention provides a pressure type flow rate control device for high-temperature gases by which flow rate control can be applied to even a high-temperature gas at 100 to 500° C. with high accuracy with an error not more than 1.0% F.S. by using an existing temperature detector. The pressure type flow rate control device generally includes a valve body VD in which fluid passage 15, 16 is formed, a valve portion V interposed in the fluid passage, a valve drive unit PE that opens and closes the fluid passage by driving the valve portion V, a restriction mechanism provided on the downstream side of the valve portion in the fluid passage, a temperature detector TC that detects a gas temperature between the valve portion and the restriction mechanism, a pressure detector P that detects a gas pressure between the valve portion and the restriction mechanism, and an arithmetic control device that arithmetically operates a flow rate of a gas distributed in the restriction mechanism based on detected values detected by the temperature detector and the pressure detector and controls the valve drive unit, wherein the temperature detector TC is inserted in an attachment hole opened inward from the upper surface side of the valve body at a position just above an outlet side fluid passage between the valve portion and the restriction mechanism.

Effects of the Invention

In accordance with the present invention, only by a configuration in which the thermistor temperature detector and the resistance temperature detector, which are conventionally used, are employed, and attaching/attachment positions of these are set near the restriction mechanism on the fluid outlet side of the valve body, and wherein the temperature detector is inserted from the upper side of the valve body, is flow rate control of a high-temperature gas at 50 to 500° C. with accuracy of ±1.0% F.S. flow rate error enabled in a flow rate range of 1 to 100%, so that the present invention has a very high practical effect. In the pressure type flow rate control device according to the present invention, when a thermistor temperature detector is used as the temperature detector, by correcting a temperature measurement error caused by individual variability of the thermistor temperature detector, the flow rate control accuracy can be improved.

In the pressure type flow rate control device according to the present invention, the temperature detector is inserted into the valve body from the upper surface side of the valve body, so that even when many pressure type flow rate control devices are arranged in parallel, maintenance and inspection of the fluid detector can be easily performed. As a result, the gas supply device, etc., in which the pressure type flow rate control device is incorporated, can be significantly downsized.

Furthermore, the fluid temperature detector is disposed just above the fluid outlet side passage of the valve main body and regulated so that the distance between the bottom surface of the fluid temperature detector and the upper wall surface of the fluid outlet side passage becomes 0.1 to 5.0 mm. Therefore, the detected temperature detected by the fluid temperature detector and the actual fluid temperature are not greatly different from each other and, as a result, very accurate temperature correction of the fluid flow rate can be performed, so that high flow rate control accuracy is obtained.

DETAILED DESCRIPTION OF THE INVENTION

Mode for Carrying Out the Invention

Hereinafter, embodiments of the present invention are described with reference to the drawings, wherein like parts are designated by like character references.

Figure 6:
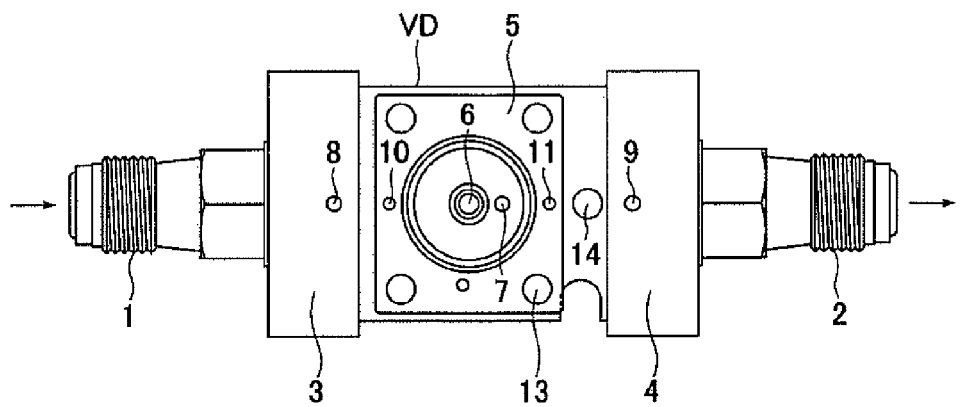
FIG. 6 is a plan view of a valve body to be used in the pressure type flow rate control device for high-temperature gases according to the present invention.

FIG. 6 is a plan view of a valve body VD to be used in a pressure type flow rate control device according to the present invention, and the valve body VD is formed of a fluid inlet side joint 1, a fluid outlet side joint 2, a gas inlet side connecting portion 3, a gas outlet side connecting portion 4, and a valve main body 5, wherein the gas inlet side connecting portion 3 is fixed to the upstream side of the valve main body 5, and the gas inlet side connecting portion is provided with the fluid inlet side joint 1. The downstream side of the valve main body 5 is also configured in the same manner, and the gas outlet side connecting portion 4 is attached airtightly to the valve main body 5, and on the outlet side of the gas outlet side connecting portion 4, the fluid outlet side joint 2 is provided.

A fluid passage is opened horizontally in the central axis direction of the valve body VD, and on the valve main body 5 at the center, various members constituting the valve portion V, etc., are placed and fixed airtightly. In FIG. 6, the reference symbols 6 and 7 denote a fluid passage in the vertical direction, the reference symbols 8 and 9 denote gas leakage inspection holes, the reference symbols 10 and 11 denote attachment holes of various detectors, etc., the reference symbol 13 denotes a bolt hole, and the reference symbol 14 denotes a temperature detector attachment hole.

In accordance with the present invention, the temperature detector attachment hole 14 is opened on the gas outlet side connecting portion 4 side of the valve main body 5 of the valve body VD, and a thermistor temperature detector TC for gas temperature detection is inserted and fixed therein. In the present embodiment, a thermistor is used as a temperature detector, however, as a matter of course, the temperature detector may be a thermocouple or a platinum resistance temperature detector, etc.

It is convenient that the bottom surface of the temperature detector attachment hole 14 is as proximal as possible to the fluid passage, however, in the present embodiment, by considering a withstanding pressure of the fluid passage wall surface, the attachment hole 14 is opened to a depth so as to leave a thickness portion with a thickness of 0.1 to 5.0 mm, preferably 0.3 to 1.5 mm, and more preferably 0.5 to 1.2 mm between the bottom surface and the fluid passage.

Figure 7:
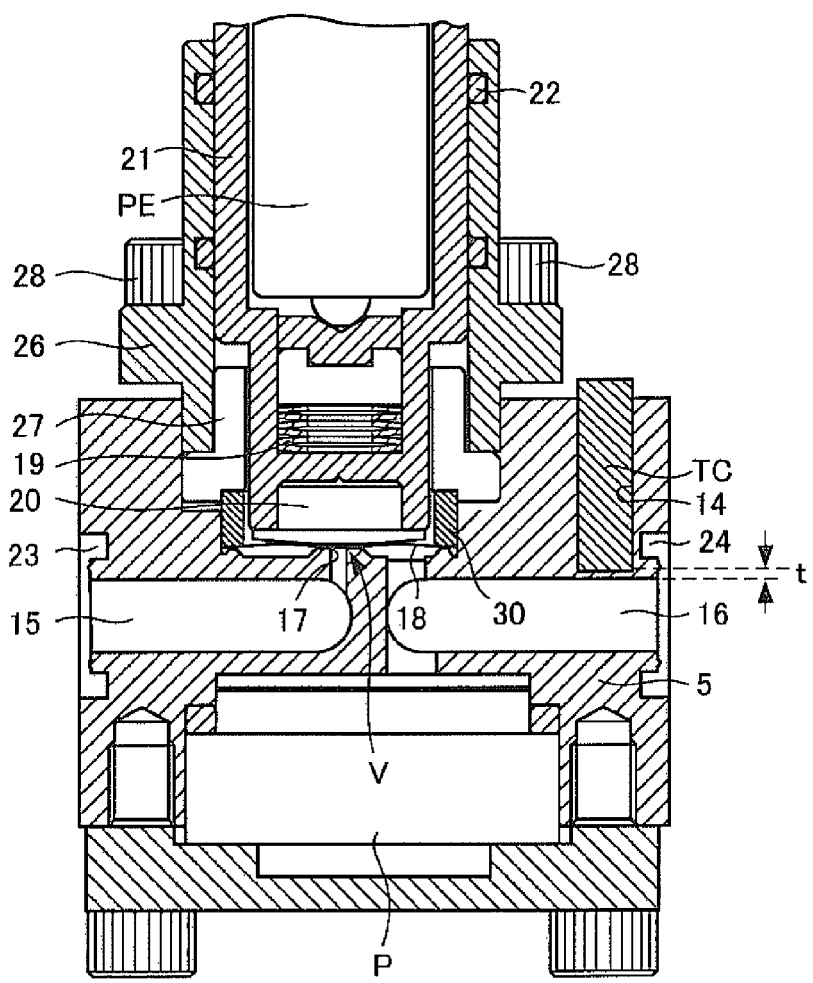
FIG. 7 is a partially cut-away longitudinal sectional view showing details of a valve main body portion of the valve body shown in FIG. 6.

FIG. 7 is an enlarged sectional view of the portion of the valve main body 5, and in FIG. 7, the reference symbol 14 denotes a temperature detector attachment hole, the reference symbols 15 and 16 denote a fluid passage, the reference symbol 17 denotes a valve seat constituting the valve portion V, the reference symbol 18 denotes a metal diaphragm valve element constituting the valve portion V, the reference symbol 19 denotes a spring (disc spring), the reference symbol 20 denotes a diaphragm presser, the reference symbol PE denotes a piezoelectric element constituting a valve drive unit, the reference symbol 21 denotes a cylinder in which the piezoelectric element PE is housed, the reference symbol 22 denotes a heatproof O-ring, the reference symbol 23 denotes a filter holding portion, the reference symbol 24 denotes an orifice holding portion, the reference symbol TC denotes a thermistor temperature detector, the reference symbol P denotes a pressure sensor, the reference symbol 26 denotes a cylinder holder, the reference symbol 27 denotes a diaphragm presser fitting, the reference symbol 28 denotes a fixing bolt, and the reference symbol 30 denotes a presser adapter. Except for the attaching/attachment position of the thermistor temperature detector TC, the internal structure and the valve drive mechanism of the valve main body 5 are known in Japanese Published Unexamined Patent Application No. 2003-120832, etc., so that detailed description thereof is omitted.

The temperature detector attachment hole 14 is opened at a position above substantially center of the lateral size of the horizontal fluid passage 16 on the gas outlet side of the valve main body 5. The thickness t between the ceiling wall of the fluid passage 16 and the bottom surface of the attaching hole 14 is set to 0.1 to 5.0 mm (here, approximately 0.5 mm) as described above. The thermistor temperature detector TC is inserted in the temperature detector attachment hole 14, and can be fixed by, for example, screwing a fixing screw into a screw hole formed on the lateral side of the valve body VD, although this is not illustrated.

Figure 8:
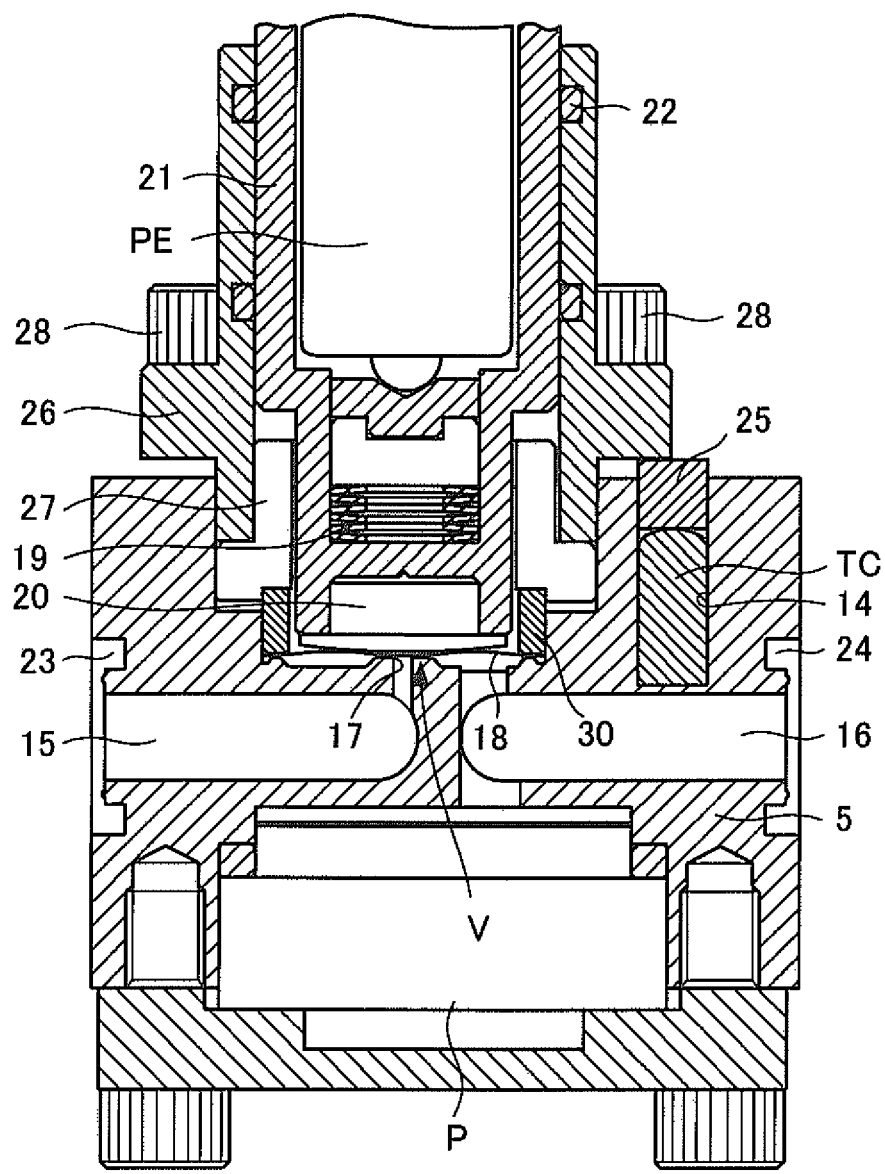
FIG. 8 is a longitudinal sectional view showing a modification of FIG. 7.

FIG. 8 is a modification of the embodiment shown in FIG. 7, wherein the position of the temperature detector attachment hole 14 is different from that in the embodiment shown in FIG. 7. The thermistor temperature detector TC shown in FIG. 8 is formed into a short columnar shape, and the spacer 25 is formed into a columnar shape and placed above the thermistor temperature detector TC inserted in the attachment hole 14. At the center of this spacer 25, a lead wire lead-out hole (not illustrated) is provided, and the upper wall surface thereof is pressed and fixed by a flange portion provided on the lower side of the cylinder holder 26 according to tightening of the fixing bolt 28.

Figure 1:
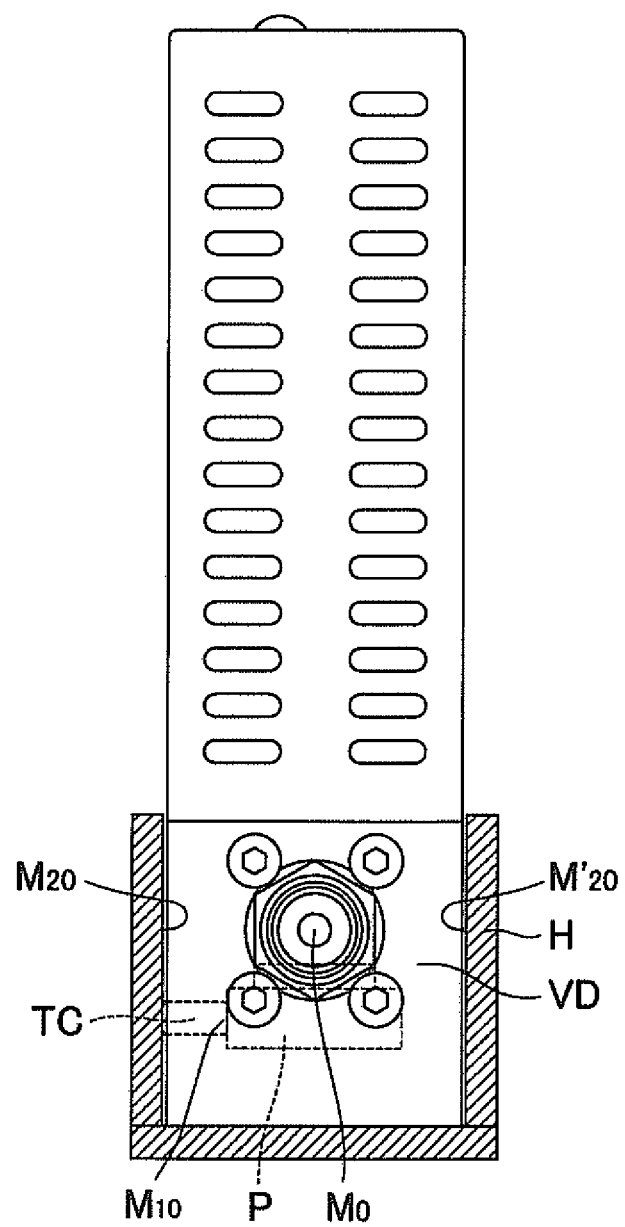
FIG. 1 is a general view of a valve body of a conventional pressure type flow rate control device provided with a heater for heating.
Figure 2:
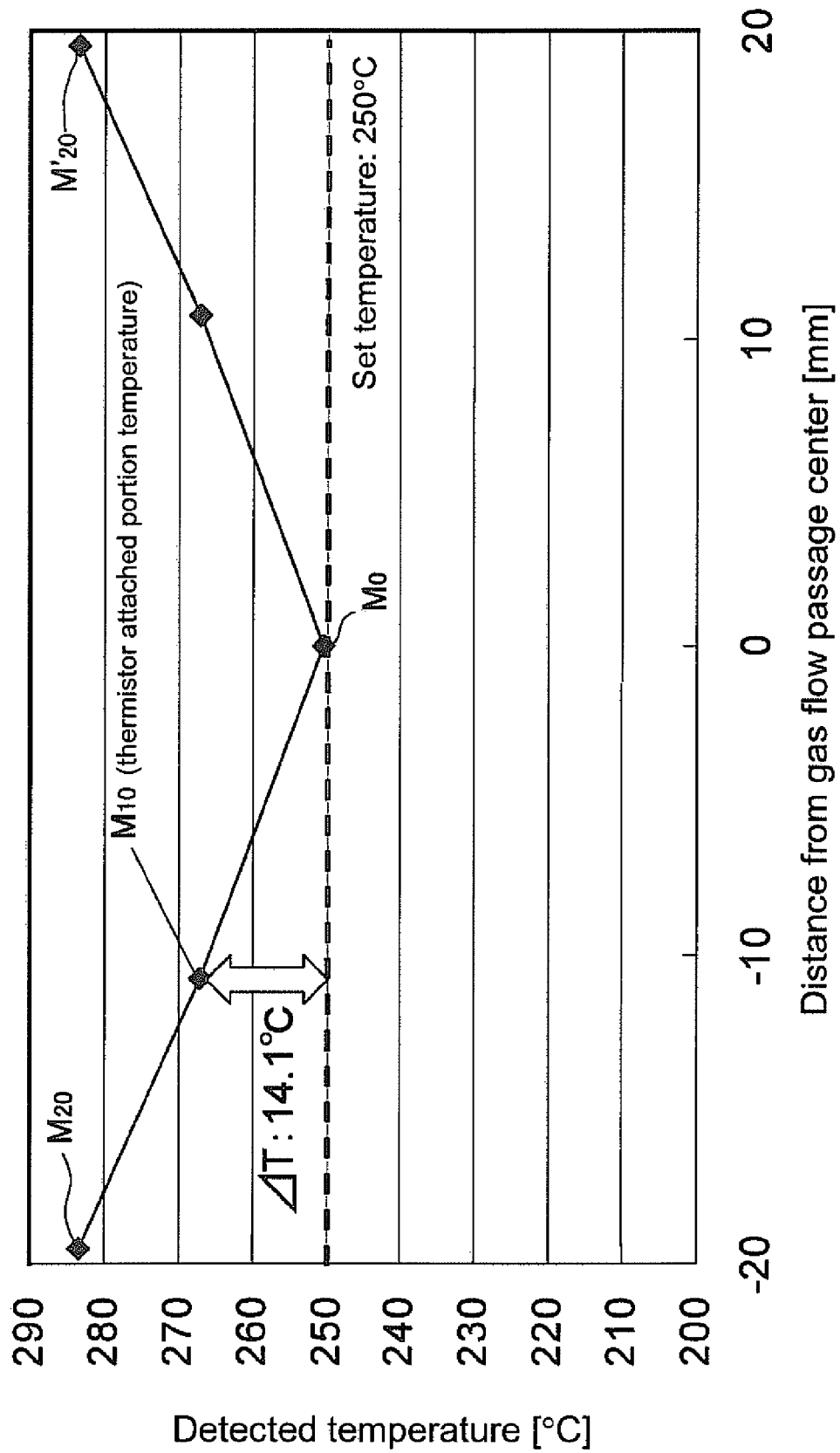
FIG. 2 shows an example of a temperature distribution from the fluid passage center when the valve body of the pressure type flow rate control device is heated to 250° C. by the heater.
Figure 3:
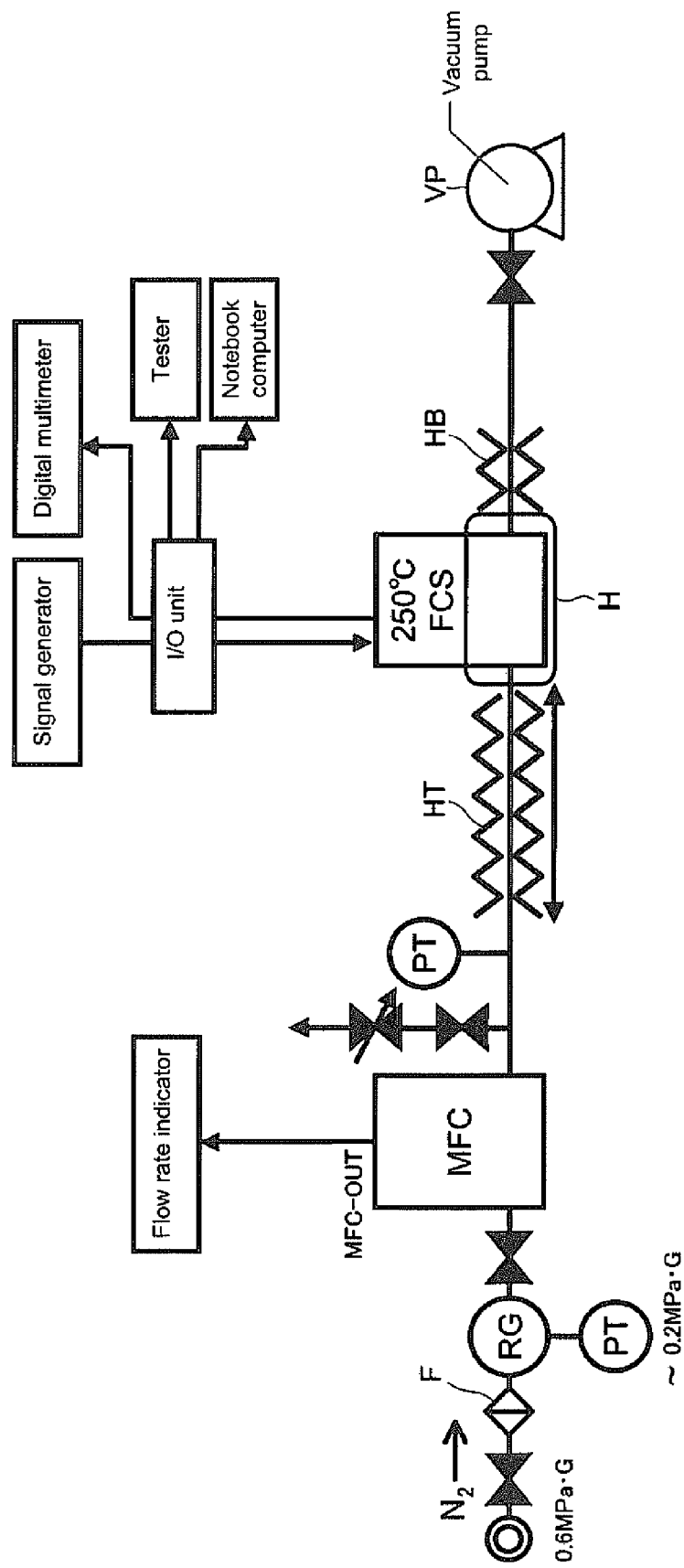
FIG. 3 is an illustration diagram of a measuring device used for measuring a temperature distribution and flow rate control accuracy of the valve body of the pressure type flow rate control device.
Figure 4:
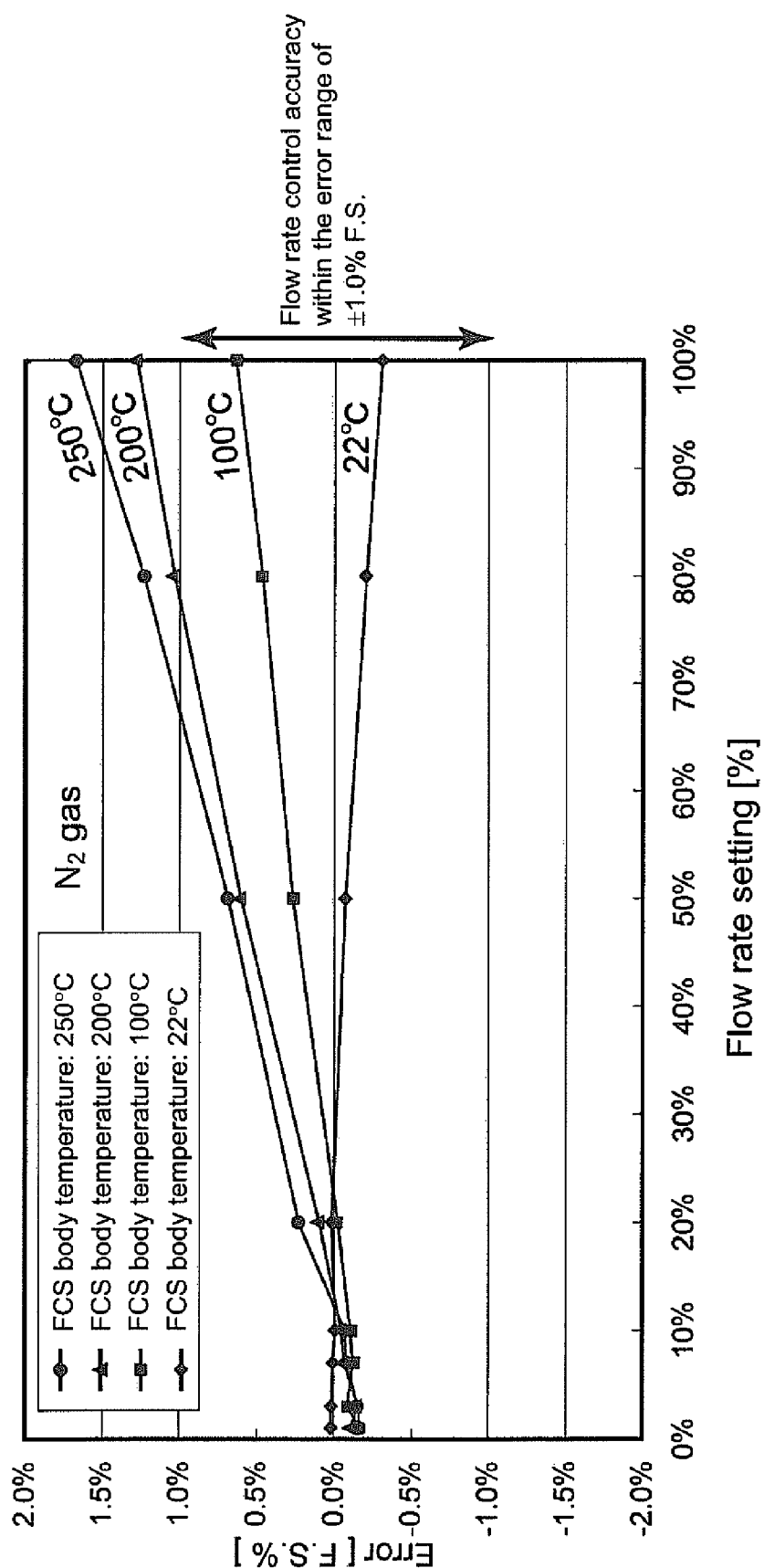
FIG. 4 is a diagram showing flow rate control accuracy characteristics when the valve body shown in FIG. 1 is heated to the respective temperatures.
Figure 5:
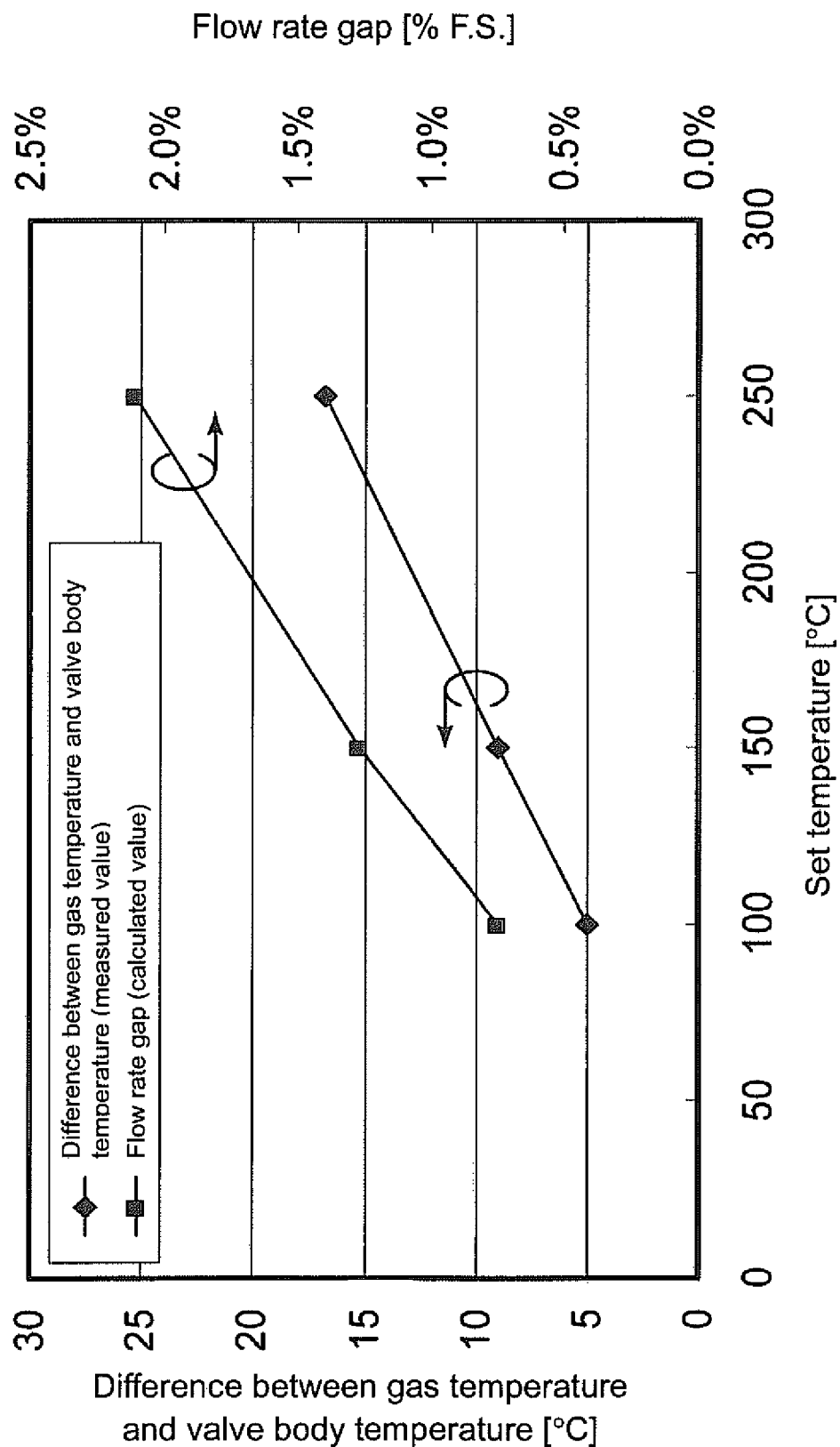
FIG. 5 is a diagram showing measured values of differences between gas temperatures (fluid passage center temperatures) and valve body detected temperatures when the valve body shown in FIG. 1 is heated to the respective temperatures by a jacket heater, and calculated values of flow rate gaps (flow rate errors) when the temperature differences occur.
Figure 9:
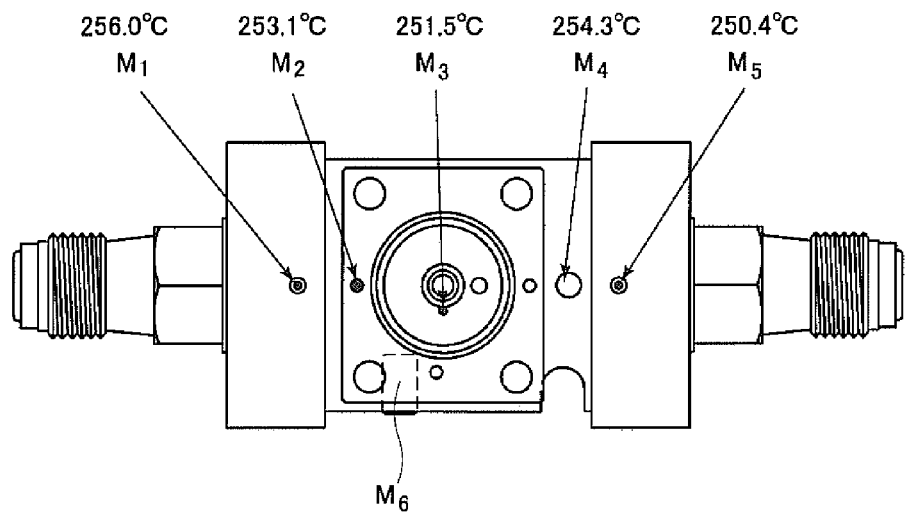
FIG. 9 is an explanatory view showing temperature measured values measured by a thermocouple at respective points inside the valve body when the valve body shown in FIG. 6 is used.
Figure 10:
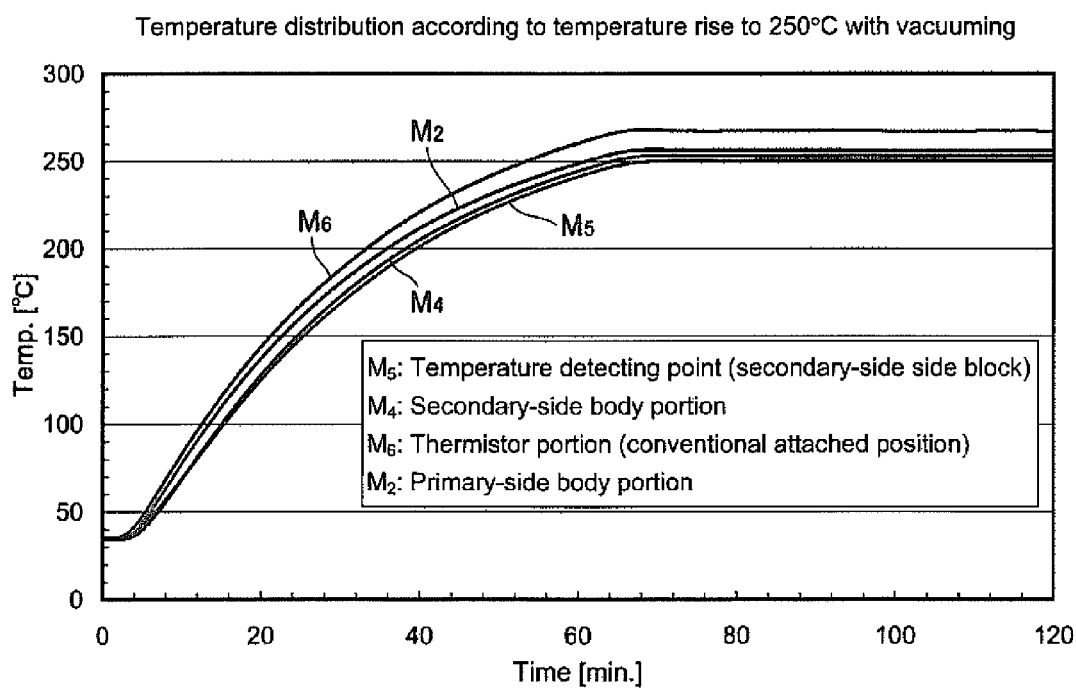
FIG. 10 shows measured values (excerpts) detected by the temperature detectors at the respective portions when the valve body shown in FIG. 6 is heated to 250° C. by the jacket heater.

FIG. 9 and FIG. 10 show temperatures at the respective portions of the valve body shown in FIG. 6, measured by the flow rate measuring device shown in FIG. 3, and rises of these temperatures. In accordance with FIG. 9 and FIG. 10, $M_1$ corresponds to a temperature detecting position provided on a side block on the inlet side of the valve body, $M_2$ corresponds to a temperature detecting position provided on the inlet side of the valve main body of the valve body, $M_3$ corresponds to a temperature detecting position provided on an upper surface of the diaphragm of the valve main body, $M_4$ corresponds to a temperature detecting position provided on an attachment position of the temperature detector (thermistor temperature detector) that detects a gas temperature after the improvement according to the present invention, $M_5$ corresponds to a temperature detecting position provided on a side block on the outlet side of the valve body, and these positions show internal temperatures of the body at a distance of 1 mm from the fluid passage (gas passage).

The valve body VD includes the valve main body 5, the gas inlet side connecting portion 3, and the fluid outlet side connecting portion 4, wherein the gas inlet side connecting portion (gas inlet-side side block) 3 and the fluid outlet side connecting portion (gas outlet-side side block) 4 are screw-fixed airtightly to the valve main body 5. The connecting portions (side blocks) 3 and 4 are provided with a fluid inlet side joint 1 and a fluid outlet side joint 2 integrally, respectively.

As clearly seen from FIG. 9 and FIG. 10, the temperature distribution at the points ($M_1$ to $M_5$) on the fluid passage of the valve body VD, at a temperature raised to approximately 250° C. by heating with the heater H, becomes a constant stable temperature state with the elapse of the heating time, and the temperature widths between the points become ±3.0° C. or less. As a result, it is found that the temperature width of the gas distributed in the fluid passage also becomes ±3.0° C. or less.

Furthermore, the mean value of the gas temperatures T at $M_1$ to $M_5$ becomes approximately 253.1° C., so that it was found that the temperature difference from the detected temperature (approximately 267.2° C.) measured at the bottom position ($M_6$) of the conventional thermistor temperature detector attachment hole formed inward from the side surface of the valve main body 5, shown in FIG. 9 by the thermocouple temperature detector, was 14.1° C.

Figure 11:
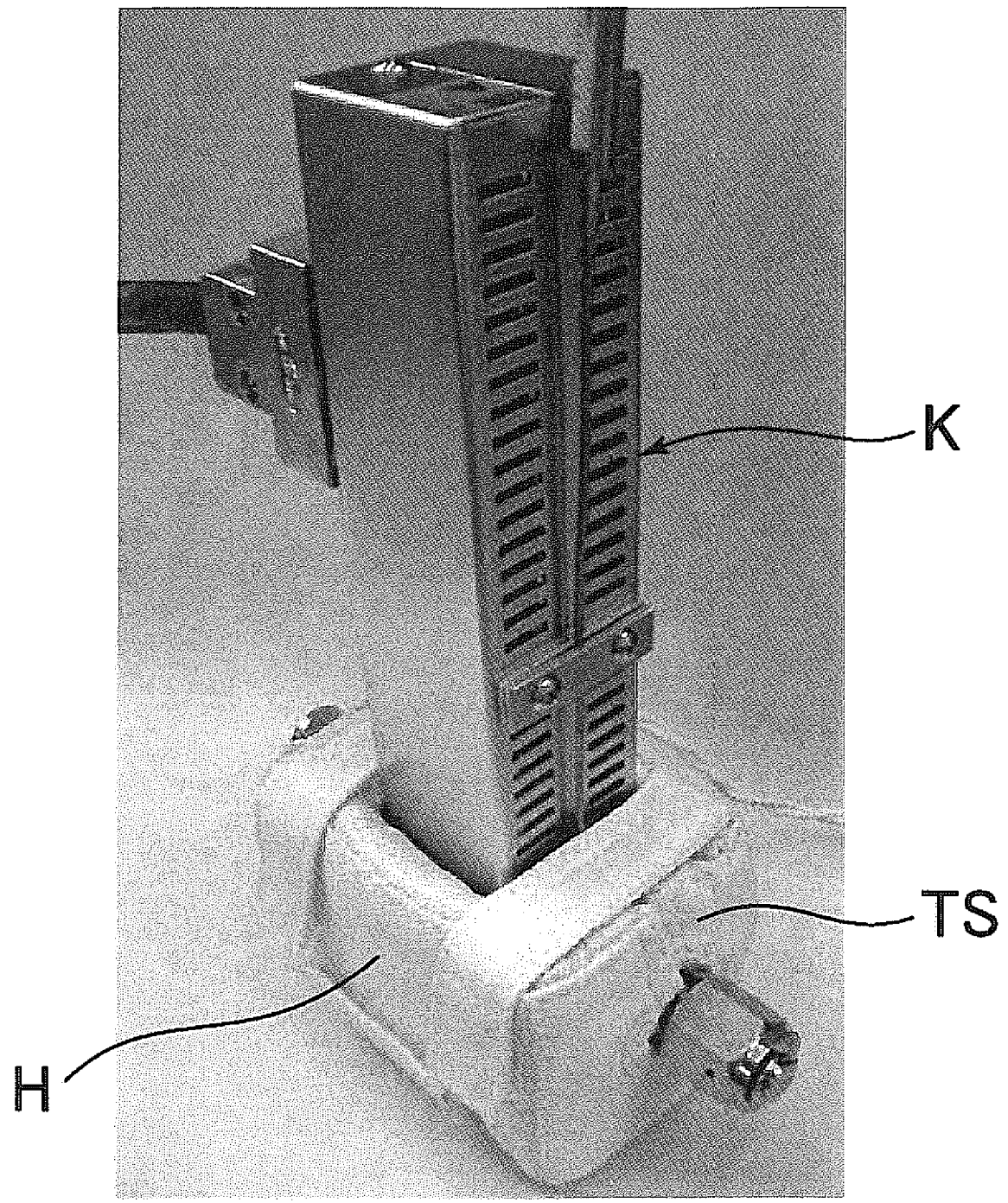
FIG. 11 is a perspective view showing an essential portion of the pressure type flow rate control device for high-temperature gases according to the present invention.

FIG. 11 is a perspective photographic view of the pressure type flow rate control device for high-temperature gases using a valve body, according to the present invention, and the bottom surface and four side surfaces of the valve body VD are surrounded by a tabular heater H, and the outer side thereof is protected by a heat insulating material TS. Depending on the gas, heating to approximately 500° C. is required, and in this case, to control this heating, the valve body must be heated to approximately 500° C. by the heater H, so that sensors are required to measure temperatures up to approximately 500° C.

In accordance with the present invention, as shown in FIG. 9 and FIG. 10, the difference between the actual temperature of the gas distributed in the fluid passage and the detected temperature detected by the thermistor temperature detector TC becomes ±3.0° C. or less as described above. As a result, the flow rate control accuracy of the pressure type flow rate control device for high-temperature gases is also significantly improved, and in a test using the flow rate measuring device shown in FIG. 6, it was confirmed that at the gas temperature of 50° C. to 250° C., the flow rate error became ±1.0% F.S. or less in the flow rate range of 10 to 100%.

The pressure type flow rate control device for high-temperature gases used for this flow rate control accuracy test was the product number FCSP7002-HT250-4J2-F100A (rated flow rate (F.S. flow rate): 2.6 to 2550 SCCM (standard cubic centimeter per minute), heater heating temperature range: up to 250° C. (Max 300° C.), orifice inner diameter: 18 to 660 μm, fluid passage opening diameter: 4.35 mm, primary-side gas pressure: Max 300 KPa abs (200 KPa G), secondary-side: vacuum) manufactured by Fujikin Incorporated, which forms a component of the apparatus shown in FIG. 11.

Next, an embodiment of correction of a measurement error caused by the individual variability of the thermistor temperature detector TC is described as follows. As described previously, conventionally, in a pressure type flow rate control device, a pressure value $P_1$ detected by the pressure detector P is corrected based on a temperature measured by the thermistor temperature detector TC. According to this pressure correction, a pressure "P" detected by the pressure detector P when the temperature measured by the thermistor temperature detector TC changes from $T_0$ to $T_1$ is corrected to a pressure "P" according to, for example, the following Equation 2. The temperature $T_0$ is normally an initial set temperature, and, for example, a room temperature may be set as temperature $T_0$.

$$P' = \sqrt{\frac{273.15 + T_1}{273.15 + T_0}} P. \quad \text{(Equation 2)}$$

As shown in Table 1 above, it has been confirmed that (i) the measurement error (ΔT) of the detected temperature detected by the thermistor temperature detector TC varies due to the individual variability, (ii) around a room temperature, the error is almost zero or, if an error occurs, the error does not influence the flow rate control accuracy, and (iii) while the measurement error (ΔT) tends to gradually increase to the positive side according to an increase in measured temperature from the initial set temperature around room temperature, (iv) an error occurs to the negative side at a temperature lower than the room temperature. Therefore, by utilizing this tendency, the temperature characteristics of the detected temperatures detected by the thermistor temperature detector TC can be approximated by a straight line.

Figure 12:
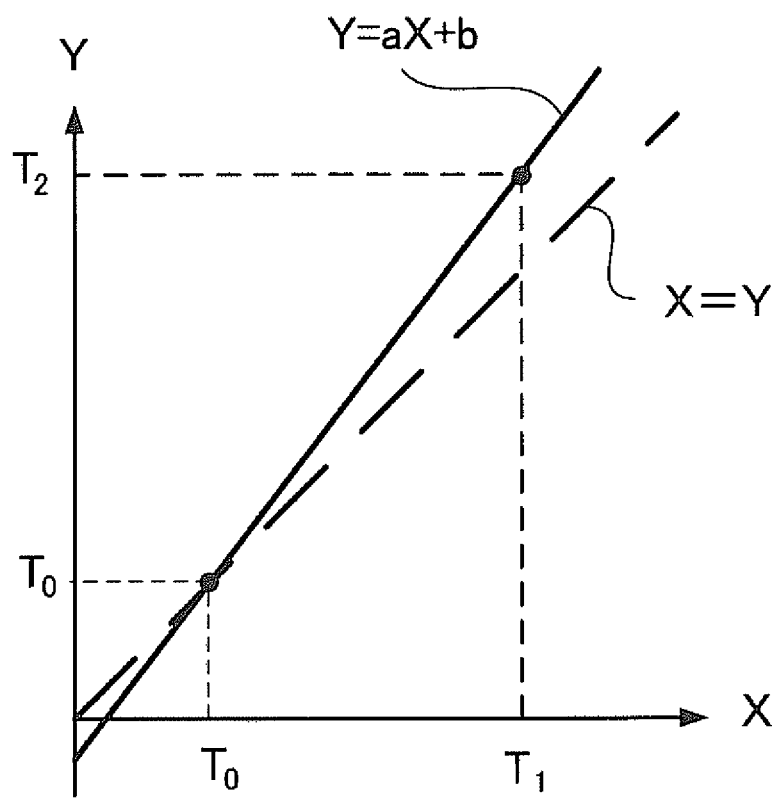
FIG. 12 is a graph of approximation of temperature characteristics of the detected temperatures detected by the thermistor temperature detector.

FIG. 12 shows a graph of straight-line approximation of the temperature characteristics of the detected temperatures detected by the thermistor temperature detector TC. In FIG. 12, the Y axis (vertical axis) corresponds to a temperature corresponding to the detected temperature detected by the thermistor temperature detector TC, and the X axis (horizontal axis) shows a temperature corresponding to the set temperature. Here, the expression "temperature corresponding to" is used for including a temperature actually measured and to a temperature not actually measured as described below. The dashed straight line shown in FIG. 12 corresponds to an ideal state in which the temperature corresponding to the detected temperature detected by the thermistor temperature detector TC is equal to the temperature corresponding to the set temperature, and the slope of the solid line shows an approximation equation that is exaggerated for easy understanding.

In the case, where the set temperature is actually measured, the gas temperature is measured by using a high-accuracy temperature detector, such as a thermocouple or a platinum resistance temperature detector, and it is guaranteed that a measurement error of the measured gas temperature, with respect to the actual gas temperature, is sufficiently small as compared with the case of using the thermistor temperature detector TC. As the set temperature, for example, a detected temperature detected by a thermocouple temperature detector of the jacket heater H, PID-controlled by the thermocouple temperature detector that detects the gas temperature, can be used.

The approximation equation is indicated by Y=aX+b, and the constants a and b are determined for each individual thermistor temperature detector TC. The constants a and b can be calculated by measuring two points (X, Y) and solving a system of equations. After the constants a and b are calculated, by substituting an arbitrarily detected temperature (Y) detected by the thermistor temperature detector TC into the approximation equation of Y=aX+b, and solving this for X, a temperature (X) corrected to an ideal temperature is obtained according to the following Equation 3. The corrected temperature (X) in Equation 3 in this case is a temperature obtained by calculation, and is not actually measured.

$$X = \frac{Y - b}{a}.$$ (Equation 3)

Referring to Table 1 above, it is known that around room temperature, the measurement error is so small that its influence on the flow rate control accuracy is negligible, so that to calculate the constants a and b of the approximation equation of Y=aX+b, by using temperatures around room temperature, for example, temperatures in the range of 20 to 26° C. as X and Y on the assumption of X=Y, actual measurement can be partially omitted. For example, when the room temperature $T_0$ is set to 22° C., the approximation equation is 22=22a+b, and by obtaining the detected temperature (Y) detected by the thermistor temperature detector TC at an arbitrarily set temperature (X) of 100 to 250° C., a system of equations can be written, and by solving the system of equations, the constants a and b can be calculated. For example, assuming that the detected temperature (Y) detected by the thermistor temperature detector TC is 153° C. with respect to a set temperature (X) of 150° C., from these values, 153=150a+b is obtained, and by solving the system of equations including this equation and 22=22a+b, the constants a and b are calculated. X=Y=22° C. in this case are also temperatures that are not actually measured, but are set in advance.

In Equation 2 described above, as a pressure correcting element, the temperature corrected to the ideal temperature is substituted for $T_1$ in Equation 2, wherein the pressure detected by the pressure detector P is substituted for P in Equation 2, and the initial set temperature is substituted for $T_0$ in Equation 2, and, accordingly, a corrected pressure P' is obtained.

By using the pressure P' corrected as described above, the pressure type flow rate control device arithmetically operates the fluid flow rate Qc according to Qc=KP$_1$' in the arithmetic control device C under critical conditions (r≤r$_C$) that the pressure ratio (P$_2$'/P$_1$') is not more than a critical pressure ratio, as in the conventional example, and feedback-controls it to the set flow rate Qs. In addition, the fluid flow rate Qc passing through the orifice S of a compressible fluid in a non-critical region in which the pressure ratio is over the critical pressure ratio is arithmetically operated according to Qc=KP$_2$'$^m$(P$_1$'-P$_2$')$^n$, (K is a proportional constant, and m and n are constants), and feedback-controlled to the set flow rate Qs.

Figure 13:
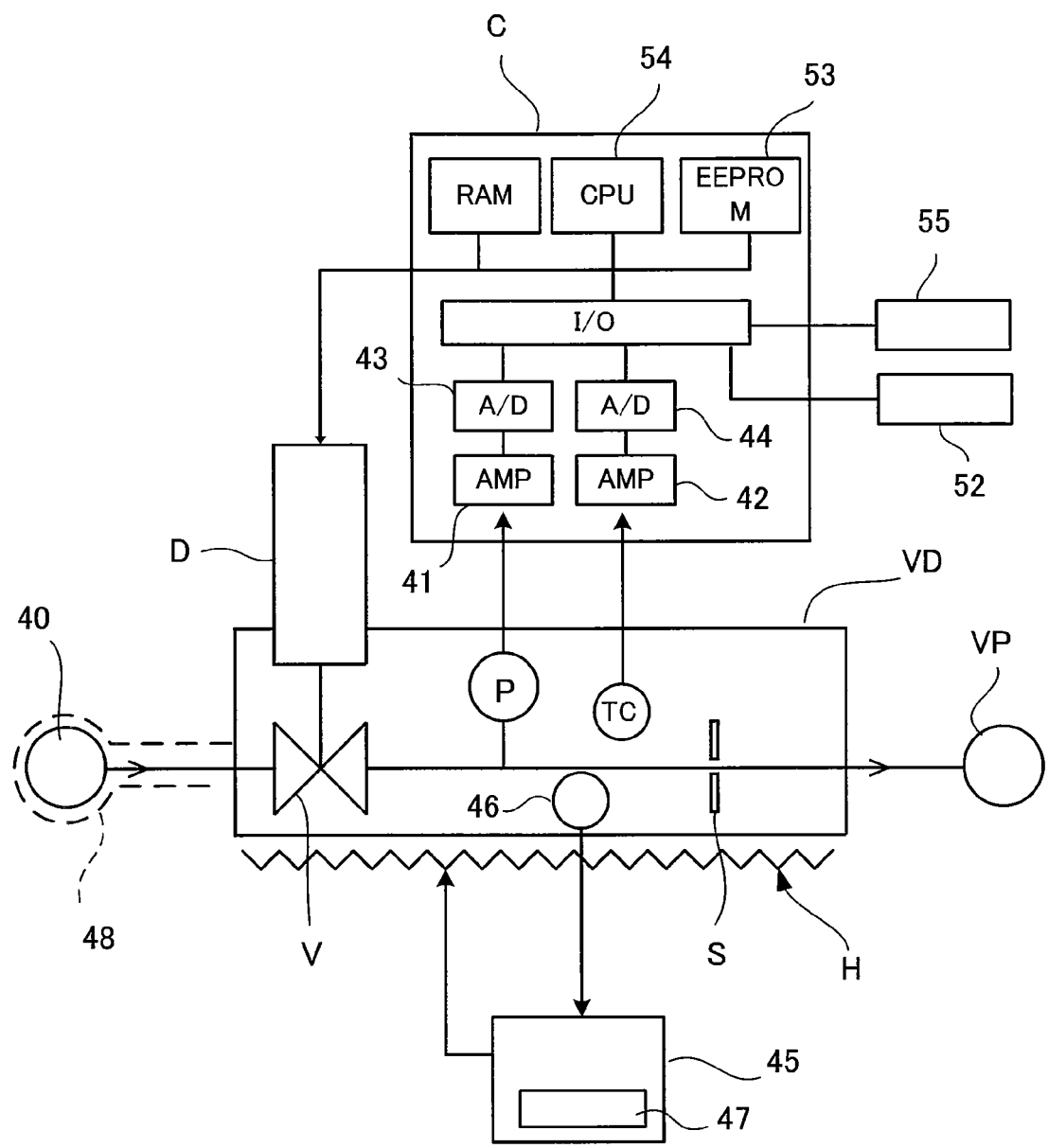
FIG. 13 is a control block diagram showing another embodiment of a pressure type flow rate control device according to the present invention.
Figure 14:
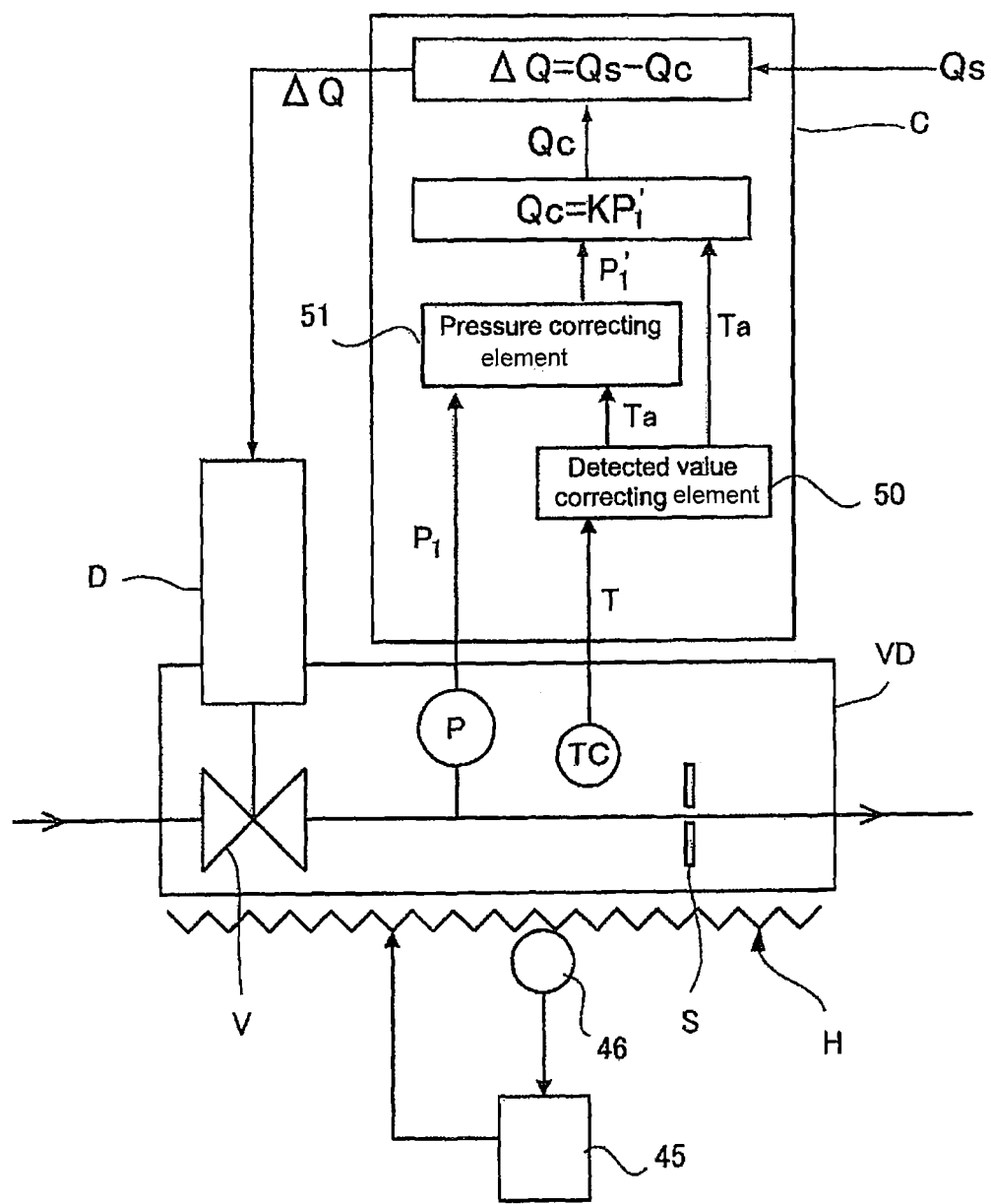
FIG. 14 is a functional block diagram of the pressure type flow rate control device shown in FIG. 13.
Figure 15:
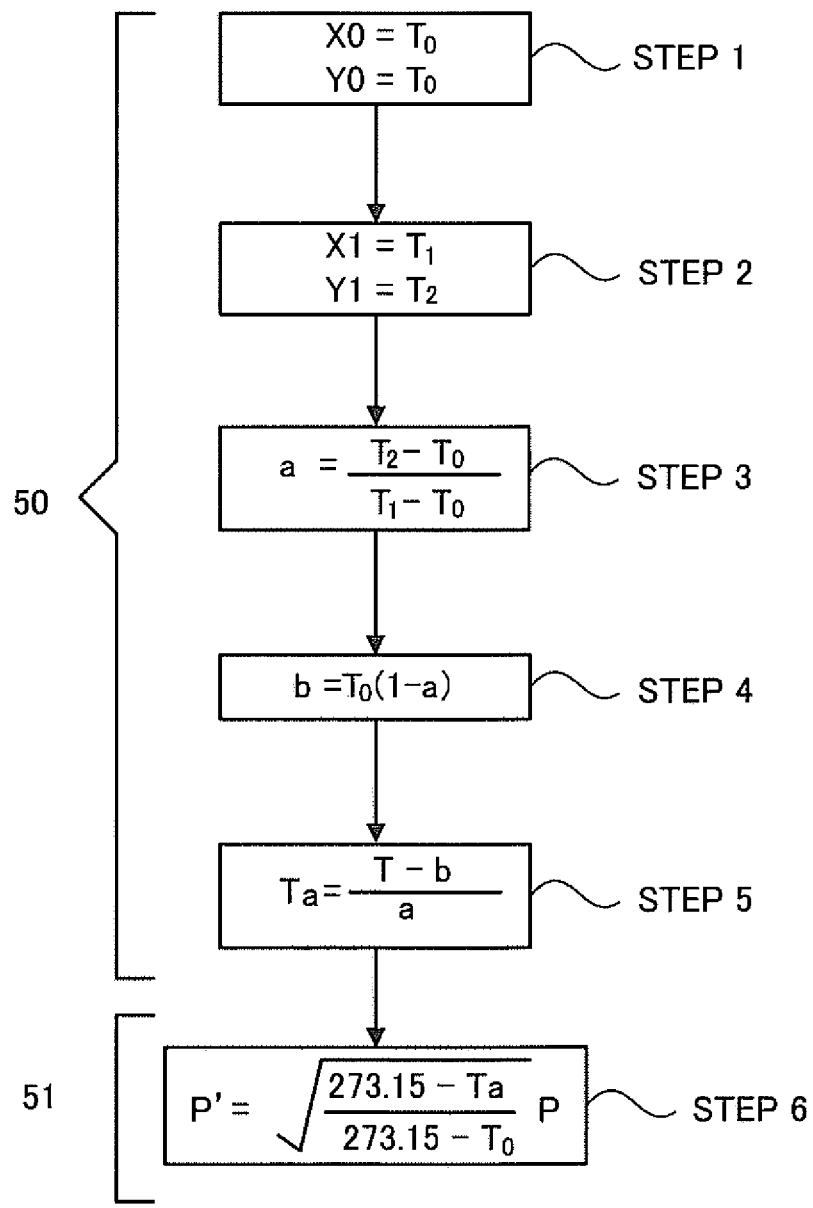
FIG. 15 is a flowchart showing steps of correcting an error of a detected temperature detected by the thermistor temperature detector of the pressure type flow rate control device shown in FIG. 14, and correcting a detected pressure by the corrected temperature.
Figure 16:
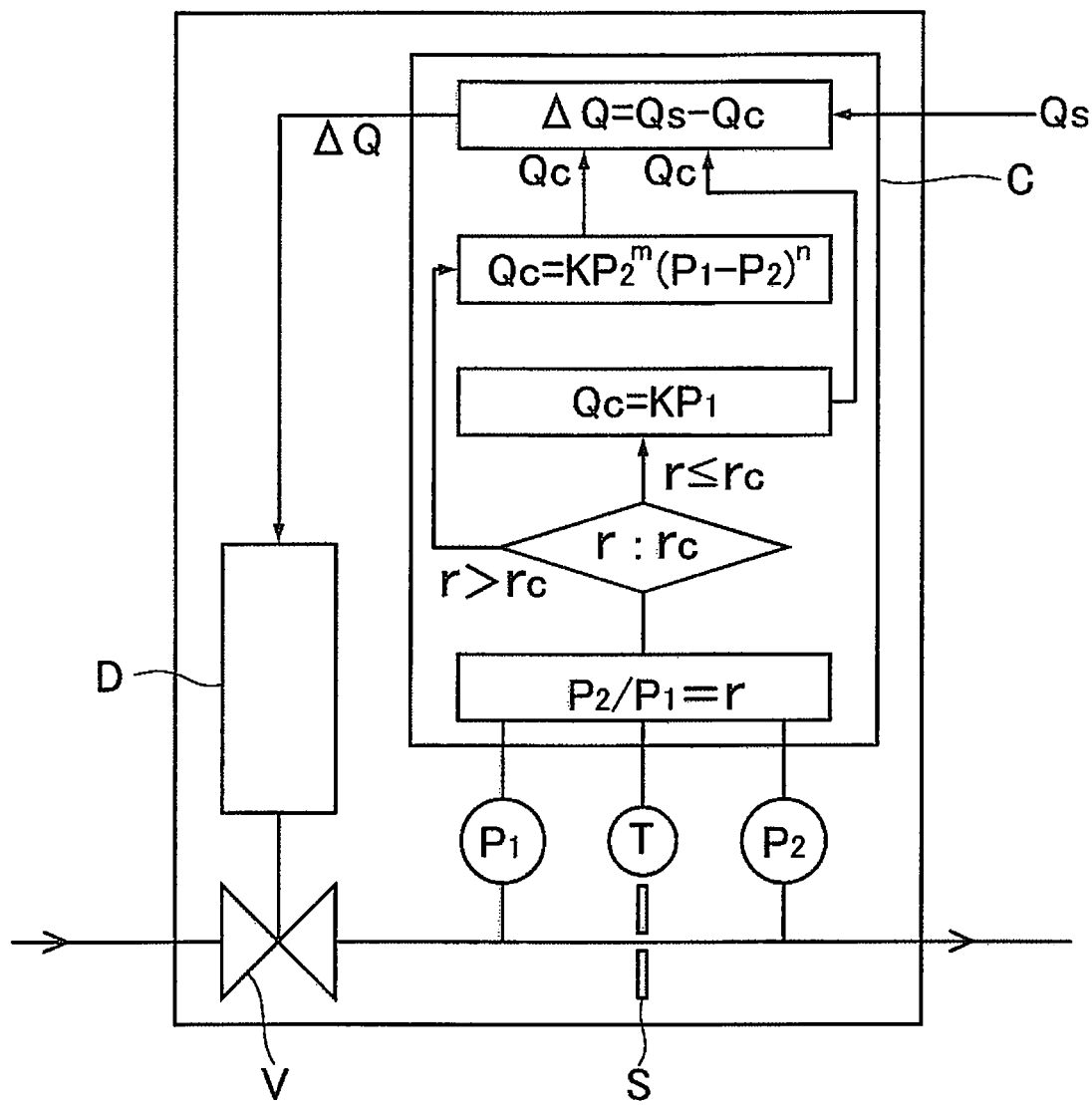
FIG. 16 is a general view of a control system of a conventional pressure type flow rate control device.
Figure 17:
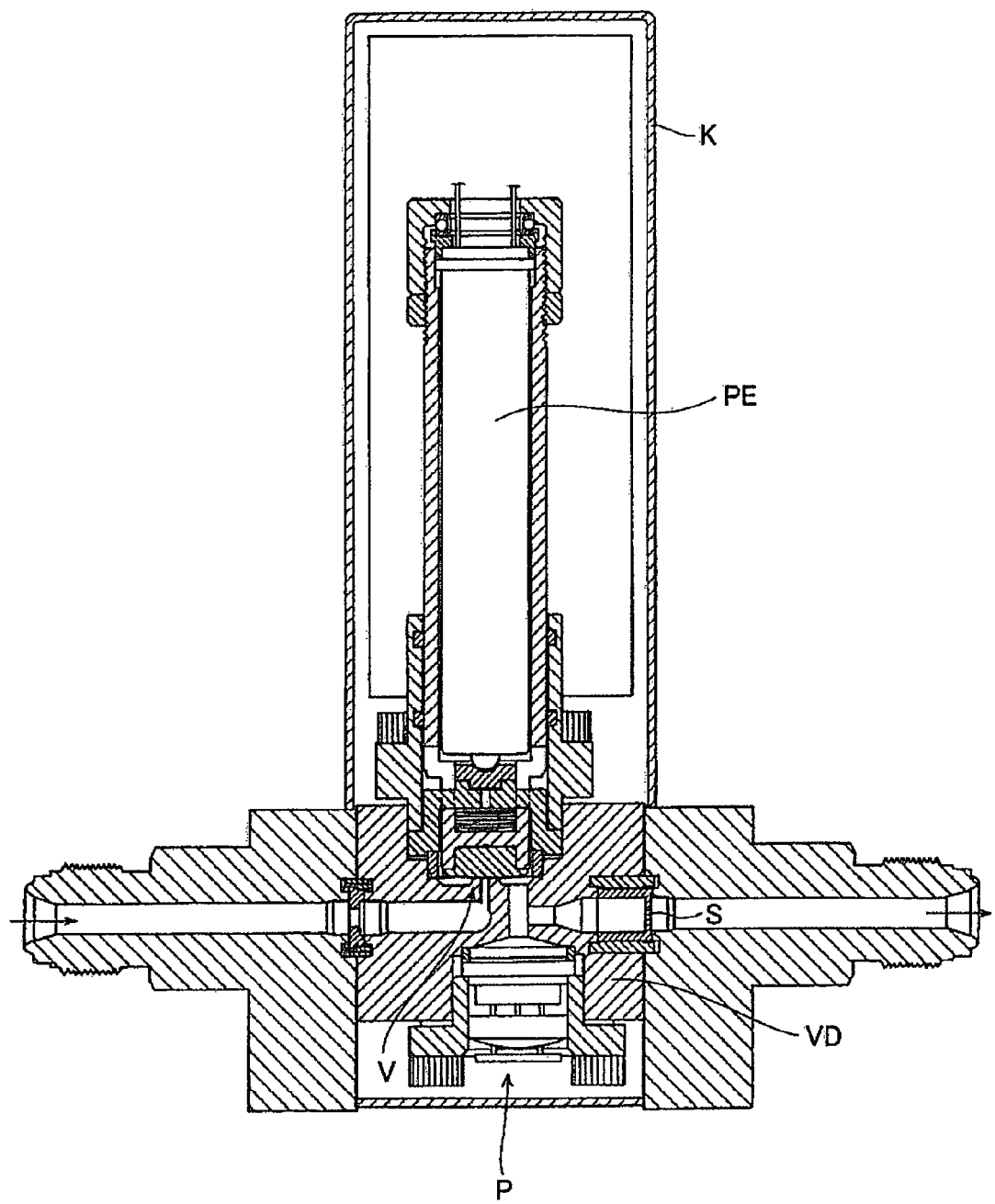
FIG. 17 is a general longitudinal sectional view of the conventional pressure type flow rate control device.
Figure 18:
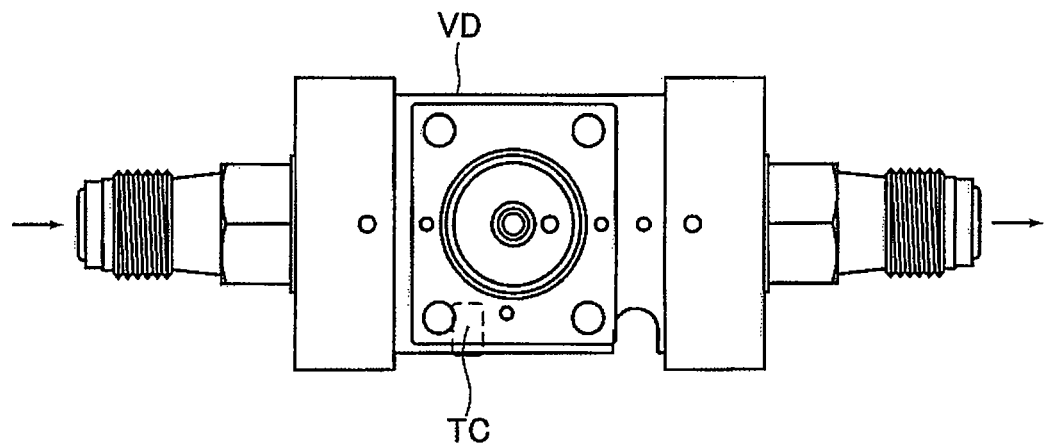
FIG. 18 is a general plan view showing a valve body VD portion of the conventional pressure type flow rate control device.
Figure 19:
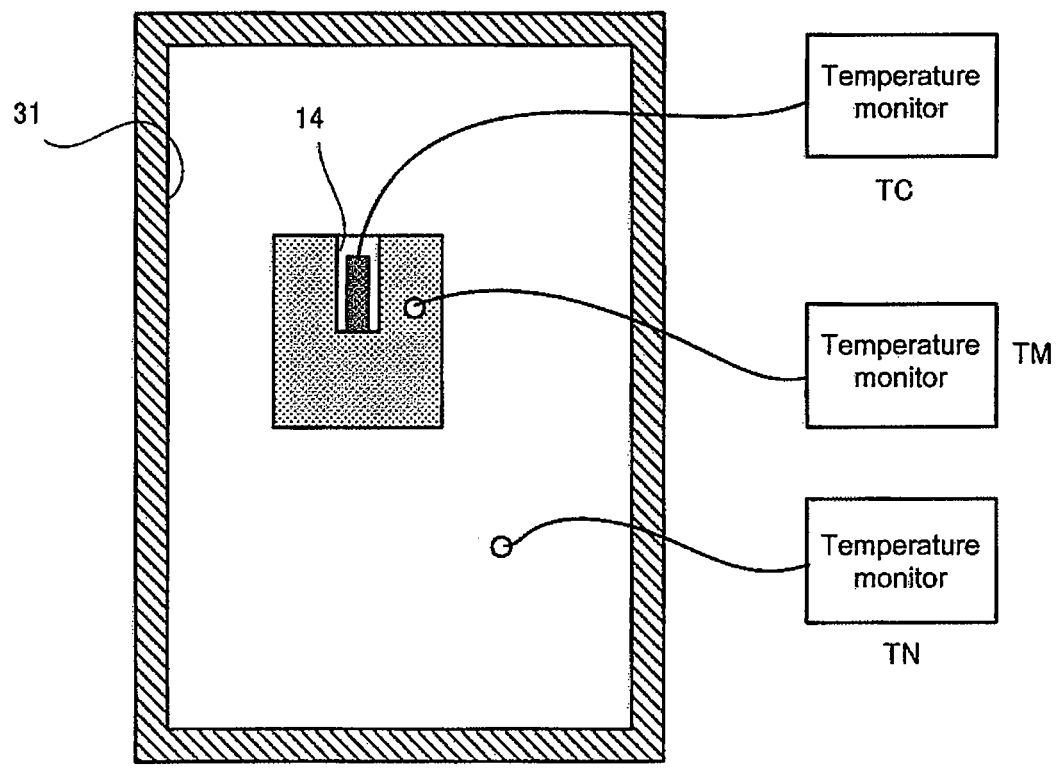
FIG. 19 is a schematic configuration diagram showing an experiment device for measuring measurement accuracy of the thermistor temperature detector.

The above-described temperature correction and pressure correction are described with reference to the control block diagram (FIG. 13), the functional block diagram (FIG. 14), and the flowchart (FIG. 15). The control block diagram shown in FIG. 13 illustrates a type that does not have a pressure detector on the downstream side of the restriction mechanism S, that is, a pressure type flow rate control device to be used under critical conditions. As shown in FIG. 13, between the gas source 40 and the vacuum pump VP, the valve body VD is connected, and by driving the vacuum pump VP, the critical conditions are achieved. Detection signals of the thermistor temperature detector TC and the pressure detector P are amplified by amplifiers 41 and 42, converted into digital signals by A/D converters 43 and 44, and then transmitted to the arithmetic control device C.

The jacket heater H performs PID (proportional-integral-derivative) control so that the set temperature is reached based on a detected value detected by the thermocouple temperature detector 46 by a temperature control device 45 provided separately from the arithmetic control device C of the pressure type flow rate control device. The detected value detected by the thermocouple temperature detector 46 is displayed as a temperature on a temperature display monitor 47. For gas temperature adjustment, the pipes that connect the gas source 40 and the valve body VD of the pressure type flow rate control device are also heated by the heating device 48.

As shown in the functional block diagram of FIG. 14, the measurement error caused by the individual variability of the thermistor temperature detector TC of the detected temperature detected by the thermistor temperature detector TC is corrected by the detected value correcting element 50, and based on the corrected temperature, the pressure is corrected by the pressure correcting element 51, a flow rate Qc is arithmetically operated based on the corrected pressure, and the arithmetically operated flow rate Qc is controlled to the set flow rate Qs. In accordance with the present invention, means corresponding to the detected value correcting element 50 and the pressure correcting element 51 may include respective programs stored in a read-only memory (ROM), which is executed by a central processing unit (CPU), such as CPU 54.

First, the initial set temperature $T_0$, preferably a room temperature (e.g., 20° C. to 26° C.) is input into the arithmetic control device C via the input device 52 (FIG. 13). For example, the temperature inside a clean room of a semiconductor manufacturing apparatus is generally controlled to a fixed temperature, so that this temperature can be applied. At this time, by displaying a gas temperature in a non-heating state in which the power supply of the jacket heater H is turned on and the heater is turned off, the displayed temperature displayed on the temperature display monitor 47 may be input as the initial set temperature $T_0$ into the arithmetic control device C. The input initial set temperature $T_0$ is stored as (X0, Y0)=($T_0$, $T_0$) in a storage unit 53 inside the arithmetic control device C (Step 1).

Next, a temperature different from the initial set temperature $T_0$, that is, preferably, a temperature $T_1$ not lower than 100° C. is set as the set temperature of the jacket heater H, and the temperature $T_1$ is input into the arithmetic control device C. When the temperature display monitor 47 of the jacket heater H displays the set temperature, the displayed temperature $T_2$ (i.e., temperature detected by the thermistor temperature detector) on the temperature display monitor 55 of the pressure type flow rate control device is input into the arithmetic control device C via the input means 52. The temperatures $T_1$ and $T_2$ input into the arithmetic control device C are stored as $(X1, Y1)=(T_1, T_2)$ in the storage unit 53 of the arithmetic control device C (Step 2).

In the arithmetic control device C, the CPU 54 calculates the constant a from the following Equation 4, and $(X0, Y0)$ and $(X1, Y1)$ are stored in the storage unit 53 (Step 3), and then the CPU 54 calculates the constant b by using the calculated constant a (Step 4).

$$a = \frac{Y1 - Y0}{X1 - X0}; \text{ and} \qquad \text{(Equation 4)}$$

$$b = T_0(1 - a). \qquad \text{(Equation 5)}$$

The calculated constants (a, b) are stored in the storage unit 53 of the arithmetic control device C.

In a state in which the jacket heater H performs heating to a fixed temperature, by an arithmetic operation, the CPU 54 of the arithmetic control device C calculates a corrected temperature Ta from the following Equation 6, wherein the constants (a, b) are calculated by Equation 4 and Equation 5, and the detected temperature T detected by the thermistor temperature detector TC, are stored in the storage unit 53 (Step 5). The calculated corrected temperature Ta is stored in the storage unit 53.

$$Ta = \frac{T - b}{a}. \qquad \text{(Equation 6)}$$

Furthermore, by performing numerical operation by substituting the corrected temperature Ta calculated by Equation 6 for T in the Equation 2 stored in the storage unit 53, and substituting the initial temperature $T_0$ stored in the storage unit 53 for $T_0$ in Equation 2, the CPU 54 of the arithmetic control device C calculates a corrected pressure P' as shown in the following Equation 7 (Step 6). The calculated pressure P is stored in the storage unit 53.

$$P' = \sqrt{\frac{273.15 + Ta}{273.15 + T_0}} P. \qquad \text{(Equation 7)}$$

Based on the pressure P' corrected as described above, the pressure type flow rate control device is controlled. As a method for controlling the pressure type flow rate control device based on the pressure P', a conventionally known method may be adopted. The corrected temperature Ta obtained by Equation 6 is also used for calculation of the proportional constant K of the flow rate operational expression of $Qc=KP_1'$.

As is clearly understood from the description given above, after the measurement error caused by the individual variability of the thermistor temperature detector TC is corrected to an ideal temperature by the detected value correcting element 50, the detected pressure is corrected by the pressure correcting element 51 by using the corrected temperature, so that the flow rate control error caused by the individual variability of the thermistor temperature detector TC can be reduced, and the flow rate of even a high-temperature gas at 250° C. can be controlled highly accurately.

As described above, with the detected value correcting element and the pressure correcting element, correction processing is executed according to a program (i.e., correction program) recorded on the storage unit 53, so that a conventional pressure type flow rate control device that is not for high temperatures can be used for high temperatures by attaching the jacket heater H thereto, machining a temperature detector attaching hole at an appropriate position on the valve body VD, and installing the correction program.

In the above-described embodiment, the temperature characteristics of the measurement accuracy of the thermistor temperature detector TC were approximated by a straight line by using two points (X, Y); however, for improvement in approximation accuracy, for example, it is also possible that the number of temperature measuring points are increased and the temperature characteristics are approximated by a straight line or curve by means of spline interpolation or least-square method. It is also possible that a correction table containing accumulated data measured in advance about the temperature characteristics of the measurement accuracy of the thermistor temperature detector TC is stored in advance in the storage unit 53, and a corrected temperature corresponding to the measured value detected by the thermistor temperature detector TC is output.

DESCRIPTION OF REFERENCE SYMBOLS

V Valve portion
VD Valve body
PE Piezoelectric element for driving
TC Thermistor temperature detector
P Pressure detector
K Case body
H Jacket heater (heater for heating)
TS Insulating material
S Orifice (restriction mechanism)
T Gas temperature
C Arithmetic control unit
D Valve drive unit
Qs Set flow rate
ΔQ Flow rate adjustment signal
1 Fluid inlet side joint
2 Fluid outlet side joint
3 Fluid (gas) inlet side connecting portion (inlet-side side block)
4 Fluid (gas) outlet side connecting portion (outlet-side side block)
5 Valve main body
6 Fluid (gas) passage (vertical direction)
7 Fluid (gas) passage (vertical direction)
8 Fluid (gas) leakage inspection hole and detector attaching hole
9 Fluid (gas) leakage inspection hole and detector attaching hole
10 Detector attaching hole
11 Detector attaching hole
13 Bolt hole
14 Temperature detector attaching hole
15 Inlet side fluid passage (horizontal direction)
16 Outlet side fluid passage (horizontal direction)
17 Valve seat
18 Diaphragm valve element
19 Spring (disc spring)
20 Diaphragm presser
21 Cylinder
22 O-ring
23 Filter holding portion 24 Restriction mechanism (orifice) holding portion
25 Spacer
26 Cylinder holder
27 Diaphragm presser fitting
28 Fixing bolt
30 Metal seal fitting

The invention claimed is:

1. A pressure type flow rate control device comprising:
   (a) a valve body, wherein a fluid passage is formed in the valve body, the valve body comprising
      (i) a valve main body;
   (b) a valve portion interposed in the fluid passage;
   (c) a valve drive unit operably connected to drive the valve portion, wherein the valve drive unit opens and closes the fluid passage by driving the valve portion;
   (d) a restriction mechanism provided on the downstream side of the valve portion in the fluid passage;
   (e) a temperature detector disposed to detect a gas temperature between the valve portion and the restriction mechanism;
   (f) a pressure detector disposed to detect a gas pressure between the valve portion and the restriction mechanism; and
   (g) an arithmetic control device that arithmetically controls a flow rate of a gas distributed in the restriction mechanism based on detected values of temperature and pressure detected by the temperature detector and the pressure detector, respectively, and the arithmetic control device controls the valve drive unit,
   wherein the valve portion attaches to the valve main body, and
   the temperature detector is inserted in an elongated bottomed attachment hole opened inward from a surface of the valve main body at a position overlapping an outlet side fluid passage between the valve portion and the restriction mechanism.

2. The pressure type flow rate control device according to claim 1, wherein the temperature detector is a thermistor temperature detector, and the arithmetic control device includes
   (i) a detected value correcting element that corrects an error of a temperature detected value detected by the thermistor temperature detector; and
   (ii) a pressure correcting element that corrects a pressure value detected by the pressure detector based on the corrected value corrected by the detected value correcting element.

3. The pressure type flow rate control device according to claim 2, wherein the detected value correcting element corrects an error of a gas temperature detected by the thermistor temperature detector based on temperature characteristics relating to detected temperatures detected by the thermistor temperature detector.

4. The pressure type flow rate control device according to claim 3, wherein the temperature characteristics are related by an approximation equation obtained from two or more different temperatures.

5. The pressure type flow rate control device according to claim 4, wherein the approximation equation is the following Equation 1, $$Y = aX + b \qquad \text{(Equation 1)},$$

wherein Y is a temperature corresponding to detected temperature detected by the thermistor temperature detector, X is a temperature corresponding to a gas measured temperature measured by a thermocouple or a platinum resistance temperature detector, and a and b are constants determined for each individual thermistor temperature detector.

6. The pressure type flow rate control device according to claim 5, wherein in Equation 1, the assumption of Y=X in the range of 20 to 26° C. is utilized to calculate the constants a and b.

7. The pressure type flow rate control device according to claim 1, wherein the valve body further comprises:
   (ii) a fluid inlet side connecting portion having a fluid inlet side joint fixed to one side surface of the valve main body; and
   (iii) a fluid outlet side connecting portion having a fluid outlet side joint fixed to the other side surface of the valve main body, and the valve main body is configured so that a filter holding portion is provided at a position opposed to the fluid inlet side connecting portion of the valve main body, and a restriction mechanism holding portion is provided at a position opposed to the fluid outlet side connecting portion of the valve main body.

8. The pressure type flow rate control device according to claim 1, further comprising:
   (h) a heater for heating that is provided on an outer side surface of the valve body for keeping temperature of a gas distributed in the fluid passage at a set temperature.

9. The pressure type flow rate control device according to claim 8, wherein the heater is a plurality of tabular heaters or a jacket heater that heats the valve body to 50° C. to 500° C.

10. The pressure type flow rate control device according to claim 1, wherein the attachment hole for the temperature detector is provided overlapping the outlet side fluid passage and has a predetermined depth, and a distance between a bottom surface of the attachment hole and a wall surface of the outlet side fluid passage is 0.1 to 5.0 mm.

11. The pressure type flow rate control device according to claim 1, wherein the pressure type flow rate control device has flow rate control accuracy wherein flow rate error becomes 1.0% F.S. or less in a gas temperature range of 50° C. to 500° C.

12. The pressure type flow rate control device according to claim 1, wherein the valve drive unit is a multilayer piezoelectric element, and a cylinder holder that holds the valve drive unit is attached to the valve body, and the temperature detector is fixed to the valve body by placing a spacer above the temperature detector inserted in the attachment hole and pressing and fixing surface of the spacer by a flange portion provided on the cylinder holder.

13. The pressure type flow rate control device according to claim 1, wherein the pressure detector and the temperature detector are configured separately from the valve body, and are combined with the valve body.

14. The pressure type flow rate control device according to claim 1, wherein the temperature detector is a thermistor temperature detector, a platinum resistance temperature detector, or a thermocouple.

* * * * *